United States Patent
Matsuzawa et al.

(10) Patent No.: US 6,182,061 B1
(45) Date of Patent: Jan. 30, 2001

(54) METHOD FOR EXECUTING AGGREGATE QUERIES, AND COMPUTER SYSTEM

(75) Inventors: Hirofumi Matsuzawa, Sagamihara; Takeshi Fukuda, Machida, both of (JP)

(73) Assignee: International Business Machines Corporation, Armonk, NY (US)

(*) Notice: Under 35 U.S.C. 154(b), the term of this patent shall be extended for 0 days.

(21) Appl. No.: 09/057,520

(22) Filed: Apr. 9, 1998

(51) Int. Cl.[7] .................................................. G06F 17/30
(52) U.S. Cl. ............................................ 707/2; 707/3
(58) Field of Search ............................ 707/1, 3, 2, 7, 707/101

(56) References Cited

U.S. PATENT DOCUMENTS

| | | | | |
|---|---|---|---|---|
| 5,511,190 | * | 4/1996 | Sharma et al. | 707/1 |
| 5,537,589 | * | 7/1996 | Dalal | 707/101 |
| 5,781,896 | * | 7/1998 | Dalal | 707/2 |
| 5,832,475 | * | 11/1998 | Agrawal et al. | 707/2 |
| 5,852,821 | * | 12/1998 | Chen et al. | 707/2 |
| 5,852,826 | * | 12/1998 | Graunke et al. | 707/7 |
| 5,963,936 | * | 10/1999 | Cochrane et al. | 707/3 |

* cited by examiner

Primary Examiner—Hosain T. Alam
Assistant Examiner—Jean M. Corrielus
(74) Attorney, Agent, or Firm—Ronald L. Drumheller

(57) ABSTRACT

To provide a method for performing a plurality of aggregations in parallel and at a high speed, in a computer system so constructed that each of a plurality of processors connected across a network can use a memory area for itself and a part of the database for itself that includes data categorized into one or a plurality of groups, a method comprising the steps of: (a) ensuring space for storing results of M aggregate queries of the N aggregate queries (M is an integer equal to or less than N) in the memory area for itself in each processor; (b) executing all of the M aggregate queries for the part of the database for itself in each processor; (c) transmitting the results of the M aggregate queries executed by each processor to another processor for counting up and calculating of a final result for counting up; and (d) repeating the steps (a) to (c) until execution of the N aggregate queries is completed by each processor.

18 Claims, 23 Drawing Sheets

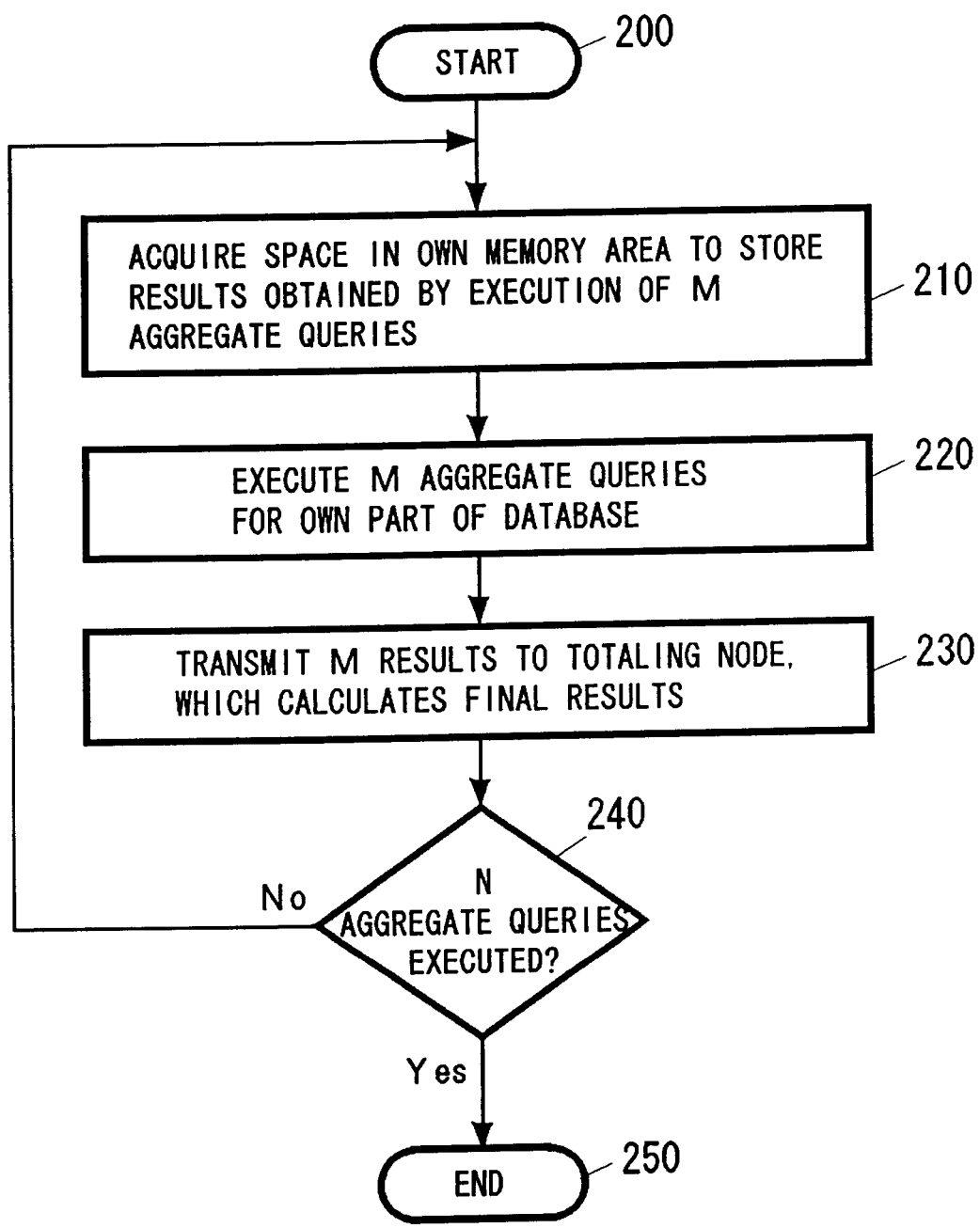
F I G. 6

Node 1

| month | day | week | location | shop# | product# | sold |
|---|---|---|---|---|---|---|
| Apr | 7 | Sun | Kyuushuu | 8 | 2 | 3 |
| Aug | 4 | Sun | Hokkaido | 12 | 1 | 4 |
| Jun | 17 | Mon | Hokkaido | 18 | 1 | 2 |
| May | 10 | Fri | Kansai | 12 | 1 | 4 |
| Mar | 13 | Wed | Kansai | 6 | 1 | 4 |
| Jul | 28 | Sun | Kyuushuu | 14 | 3 | 1 |
| Apr | 23 | Tue | Kansai | 16 | 1 | 9 |
| Mar | 16 | Sat | Kansai | 13 | 1 | 8 |
| Mar | 16 | Sat | Hokkaido | 7 | 2 | 6 |

FIG. 7

Node 2

| month | day | week | location | shop# | product# | sold |
|---|---|---|---|---|---|---|
| Jul | 3 | Wed | Kansai | 11 | 2 | 6 |
| Mar | 21 | Thu | Kyuushuu | 8 | 3 | 1 |
| May | 6 | Mon | Kanto | 1 | 2 | 2 |
| Aug | 2 | Fri | Hokkaido | 6 | 1 | 9 |
| May | 2 | Thu | Kansai | 6 | 3 | 7 |
| Apr | 22 | Mon | Kyuushuu | 16 | 2 | 3 |
| Mar | 28 | Thu | Kanto | 14 | 3 | 6 |
| Jul | 20 | Sat | Kanto | 17 | 3 | 2 |
| Aug | 18 | Sun | Kanto | 11 | 1 | 9 |

FIG. 8

Node 3

| month | day | week | location | shop# | product# | sold |
|---|---|---|---|---|---|---|
| Aug | 3 | Sat | Kyuushuu | 8 | 3 | 7 |
| Apr | 9 | Tue | Hokkaido | 10 | 1 | 8 |
| May | 9 | Thu | Hokkaido | 18 | 1 | 8 |
| Mar | 1 | Fri | Kanto | 20 | 3 | 8 |
| Apr | 30 | Tue | Hokkaido | 12 | 1 | 3 |
| Mar | 5 | Tue | Hokkaido | 1 | 1 | 3 |
| Apr | 11 | Thu | Kansai | 5 | 2 | 1 |
| Apr | 6 | Sat | Kanto | 5 | 1 | 9 |
| Mar | 27 | Wed | Hokkaido | 5 | 2 | 1 |

F I G. 9

Node 4

| month | day | week | location | shop# | product# | sold |
|---|---|---|---|---|---|---|
| Jul | 10 | Wed | Hokkaido | 9 | 1 | 9 |
| Aug | 10 | Sat | Kanto | 18 | 3 | 9 |
| Apr | 21 | Sun | Kanto | 18 | 3 | 8 |
| Jun | 29 | Sat | Kansai | 14 | 2 | 3 |
| Aug | 16 | Fri | Kansai | 1 | 2 | 6 |
| Feb | 6 | Wed | Kanto | 13 | 1 | 8 |
| Jan | 19 | Sat | Kansai | 6 | 3 | 4 |
| Mar | 19 | Tue | Hokkaido | 13 | 1 | 3 |
| Mar | 2 | Sat | Kyuushuu | 3 | 1 | 5 |

F I G. 10

QUERY 1

| month | sum(sold) |
|---|---|
| Apr | 3 |
| Jun | 2 |
| Aug | 4 |

QUERY 2

| week | sum(sold) |
|---|---|
| Mon | 2 |
| Sun | 7 |

QUERY 3

| location | sum(sold) |
|---|---|
| Hokkaido | 6 |
| kyuushuu | 3 |

QUERY 4

| product# | sum(sold) |
|---|---|
| 1 | 6 |
| 2 | 3 |

QUERY 5

| location | week | sum(sold) |
|---|---|---|
| Hokkaido | Sun | 4 |
| Hokkaido | Mon | 2 |
| Kyuushuu | Sun | 3 |

F I G. 11

QUERY 1

| month | sum(sold) |
|---|---|
| Mar | 18 |
| Apr | 12 |
| May | 4 |
| Jun | 2 |
| Jul | 1 |
| Aug | 4 |

QUERY 2

| week | sum(sold) |
|---|---|
| Mon | 2 |
| Tue | 9 |
| Wed | 4 |
| Fri | 4 |
| Sat | 14 |
| Sun | 8 |

QUERY 3

| location | sum(sold) |
|---|---|
| Hokkaido | 12 |
| Kansai | 25 |
| Kyuushuu | 4 |

QUERY 4

| product# | sum(sold) |
|---|---|
| 1 | 31 |
| 2 | 9 |
| 3 | 1 |

QUERY 5

| location | week | sum(sold) |
|---|---|---|
| Hokkaido | Mon | 2 |
| Hokkaido | Sat | 6 |
| Hokkaido | Sun | 4 |
| Kansai | Tue | 9 |
| Kansai | Wed | 4 |
| Kansai | Fri | 4 |
| Kansai | Sat | 8 |
| Kyuushuu | Sun | 4 |

F I G. 12

QUERY 1

| month | sum(sold) |
|---|---|
| Mar | 7 |
| Apr | 3 |
| May | 9 |
| Jul | 8 |
| Aug | 18 |

QUERY 2

| week | sum(sold) |
|---|---|
| Mon | 5 |
| Wed | 6 |
| Thu | 14 |
| Fri | 9 |
| Sat | 2 |
| Sun | 9 |

QUERY 3

| location | sum(sold) |
|---|---|
| Hokkaido | 9 |
| Kanto | 19 |
| Kansai | 13 |
| Kyuushuu | 4 |

QUERY 4

| product# | sum(sold) |
|---|---|
| 1 | 18 |
| 2 | 11 |
| 3 | 16 |

QUERY 5

| location | week | sum(sold) |
|---|---|---|
| Hokkaido | Fri | 9 |
| Kanto | Mon | 2 |
| Kanto | Thu | 6 |
| Kanto | Sat | 2 |
| Kanto | Sun | 9 |
| Kansai | Wed | 6 |
| Kansai | Thu | 7 |
| Kyuushuu | Mon | 3 |
| Kyuushuu | Thu | 1 |

FIG. 13

QUERY 1

| month | sum(sold) |
|---|---|
| Mar | 12 |
| Apr | 21 |
| May | 8 |
| Aug | 7 |

QUERY 2

| week | sum(sold) |
|---|---|
| Tue | 14 |
| Wed | 1 |
| Thu | 9 |
| Fri | 8 |
| Sat | 16 |

QUERY 3

| location | sum(sold) |
|---|---|
| Hokkaido | 23 |
| Kanto | 17 |
| Kansai | 1 |
| Kyuushuu | 7 |

QUERY 4

| product# | sum(sold) |
|---|---|
| 1 | 31 |
| 2 | 2 |
| 3 | 15 |

QUERY 5

| location | week | sum(sold) |
|---|---|---|
| Hokkaido | Tue | 14 |
| Hokkaido | Wed | 1 |
| Hokkaido | Thu | 8 |
| Kanto | Fri | 8 |
| Kanto | Sat | 9 |
| Kansai | Thu | 1 |
| Kyuushuu | Sat | 7 |

FIG. 14

QUERY 1

| month | sum(sold) |
|---|---|
| Jan | 4 |
| Feb | 8 |
| Mar | 8 |
| Apr | 8 |
| Jun | 3 |
| Jul | 9 |
| Aug | 15 |

QUERY 2

| week | sum(sold) |
|---|---|
| Tue | 3 |
| Wed | 17 |
| Fri | 6 |
| Sat | 21 |
| Sun | 8 |

QUERY 3

| location | sum(sold) |
|---|---|
| Hokkaido | 12 |
| Kanto | 25 |
| Kansai | 13 |
| Kyuushuu | 5 |

QUERY 4

| product# | sum(sold) |
|---|---|
| 1 | 25 |
| 2 | 9 |
| 3 | 21 |

QUERY 5

| location | week | sum(sold) |
|---|---|---|
| Hokkaido | Tue | 3 |
| Hokkaido | Wed | 9 |
| Kanto | Wed | 8 |
| Kanto | Sat | 9 |
| Kanto | Sun | 8 |
| Kansai | Fri | 6 |
| Kansai | Sat | 7 |
| Kyuushuu | Sat | 5 |

F I G. 15

QUERY 1

| month | sum(sold) |
|---|---|
| Jan | 4 |
| Feb | 8 |

QUERY 2

| week | sum(sold) |
|---|---|
| Mon | 7 |
| Tue | 26 |

QUERY 3

| location | sum(sold) |
|---|---|
| Hokkaido | 56 |

QUERY 4

| product# | sum(sold) |
|---|---|
| 1 | 105 |

QUERY 5

| location | week | sum(sold) |
|---|---|---|
| Hokkaido | Mon | 2 |
| Hokkaido | Tue | 17 |
| Hokkaido | Wed | 10 |
| Hokkaido | Thu | 8 |
| Hokkaido | Fri | 9 |
| Hokkaido | Sat | 6 |
| Hokkaido | Sun | 4 |

F I G. 16

QUERY 1

| month | sum(sold) |
|---|---|
| Mar | 45 |
| Apr | 44 |

QUERY 2

| week | sum(sold) |
|---|---|
| Wed | 28 |
| Thu | 23 |

QUERY 3

| location | sum(sold) |
|---|---|
| Kanto | 61 |

QUERY 4

| product# | sum(sold) |
|---|---|
| 2 | 31 |

QUERY 5

| location | week | sum(sold) |
|---|---|---|
| Kanto | Mon | 2 |
| Kanto | Wed | 8 |
| Kanto | Thu | 6 |
| Kanto | Fri | 8 |
| Kanto | Sat | 20 |
| Kanto | Sun | 17 |

F I G. 17

QUERY 1

| month | sum(sold) |
|---|---|
| May | 21 |
| Jun | 5 |

QUERY 2

| week | sum(sold) |
|---|---|
| Fri | 27 |
| Sat | 53 |

QUERY 3

| location | sum(sold) |
|---|---|
| Kansai | 52 |

QUERY 4

| product# | sum(sold) |
|---|---|
| 3 | 53 |

QUERY 5

| location | week | sum(sold) |
|---|---|---|
| Kansai | Tue | 9 |
| Kansai | Wed | 10 |
| Kansai | Thu | 8 |
| Kansai | Fri | 10 |
| Kansai | Sat | 15 |

FIG. 18

QUERY 1

| month | sum(sold) |
|---|---|
| Jul | 18 |
| Aug | 44 |

QUERY 2

| week | sum(sold) |
|---|---|
| Sun | 25 |

QUERY 3

| location | sum(sold) |
|---|---|
| Kyuushuu | 20 |

QUERY 4

| product# | sum(sold) |
|---|---|

QUERY 5

| location | week | sum(sold) |
|---|---|---|
| Kyuushuu | Mon | 3 |
| Kyuushuu | Thu | 1 |
| Kyuushuu | Sat | 12 |
| Kyuushuu | Sun | 4 |

FIG. 19

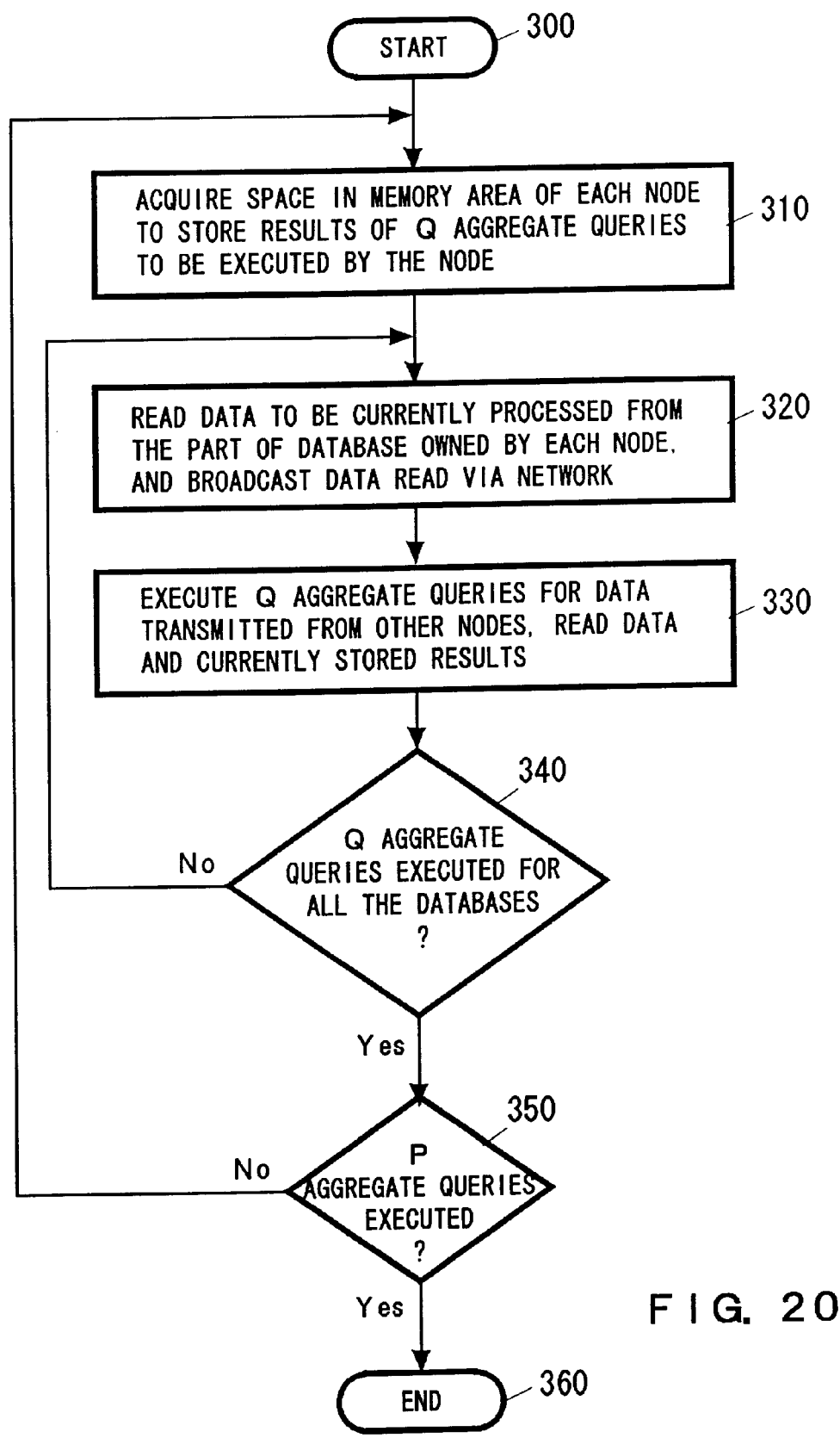
F I G. 20

QUERY 2

| week | sum(sold) |
|------|-----------|
| Mon  | 7         |
| Tue  | 26        |
| Wed  | 28        |
| Thu  | 23        |
| Fri  | 27        |
| Sat  | 53        |
| Sun  | 25        |

QUERY 3

| location | sum(sold) |
|----------|-----------|
| Hokkaido | 56        |
| Kanto    | 61        |
| Kansai   | 52        |
| Kyuusyuu | 20        |

F I G. 22

Node 1

| month | sum(sold) |
|---|---|
| Jan | 4 |
| Feb | 8 |
| Mar | 45 |
| Apr | 44 |
| May | 21 |
| Jun | 5 |
| Jul | 18 |
| Aug | 44 |

Node 3

| product# | sum(sold) |
|---|---|
| 1 | 105 |
| 2 | 31 |
| 3 | 53 |

Node 4

| location | week | sum(sold) |
|---|---|---|
| Hokkaido | Mon | 2 |
| Hokkaido | Tue | 17 |
| Hokkaido | Wed | 10 |
| Hokkaido | Thu | 8 |
| Hokkaido | Fri | 9 |
| Hokkaido | Sat | 6 |
| Hokkaido | Sun | 4 |
| Kanto | Mon | 2 |
| Kanto | Wed | 8 |
| Kanto | Thu | 6 |
| Kanto | Fri | 8 |
| Kanto | Sat | 20 |
| Kanto | Sun | 17 |
| Kansai | Tue | 9 |
| Kansai | Wed | 10 |
| Kansai | Thu | 8 |
| Kansai | Fri | 10 |
| Kansai | Sat | 15 |
| Kyuushuu | Mon | 3 |
| Kyuushuu | Thu | 1 |
| Kyuushuu | Sat | 12 |
| Kyuushuu | Sun | 4 |

F I G. 23

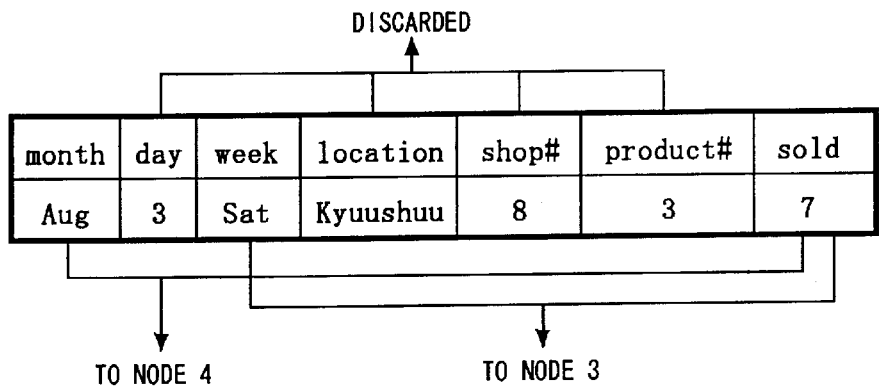
F I G. 25
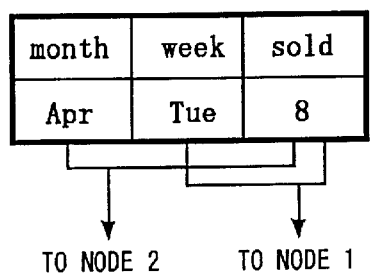
F I G. 26
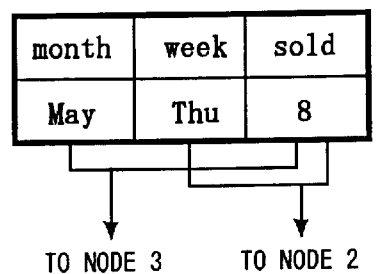
F I G. 27
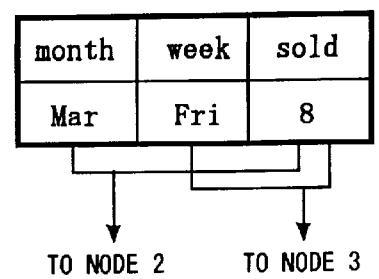
F I G. 28

NODE 1

| month | sold |
|-------|------|
| Apr | 3 | ⇒ NODE 2
| Aug | 4 | ⇒ NODE 4
| Jun | 2 | ⇒ NODE 3
| May | 4 | ⇒ NODE 3
| Mar | 4 | ⇒ NODE 2
| Jul | 1 | ⇒ NODE 4
| Apr | 9 | ⇒ NODE 2
| Mar | 8 | ⇒ NODE 2
| Mar | 6 | ⇒ NODE 2

NODE 2

| month | sold |
|-------|------|
| Jul | 6 | ⇒ NODE 4
| Mar | 1 | ⇒ NODE 2
| May | 2 | ⇒ NODE 3
| Aug | 9 | ⇒ NODE 4
| May | 7 | ⇒ NODE 3
| Apr | 3 | ⇒ NODE 2
| Mar | 6 | ⇒ NODE 2
| Jul | 2 | ⇒ NODE 4
| Aug | 9 | ⇒ NODE 4

NODE 3

| month | sold |
|-------|------|
| Aug | 7 | ⇒ NODE 4
| Apr | 8 | ⇒ NODE 2
| May | 8 | ⇒ NODE 3
| Mar | 8 | ⇒ NODE 2
| Apr | 3 | ⇒ NODE 2
| Mar | 3 | ⇒ NODE 2
| Apr | 1 | ⇒ NODE 2
| Apr | 9 | ⇒ NODE 2
| Mar | 1 | ⇒ NODE 2

NODE 4

| month | sold |
|-------|------|
| Jul | 9 | ⇒ NODE 4
| Aug | 9 | ⇒ NODE 4
| Apr | 8 | ⇒ NODE 2
| Jun | 3 | ⇒ NODE 3
| Aug | 6 | ⇒ NODE 4
| Feb | 8 | ⇒ NODE 1
| Jan | 4 | ⇒ NODE 1
| Mar | 3 | ⇒ NODE 2
| Mar | 5 | ⇒ NODE 2

FIG. 29

NODE 1

| | month | sold |
|---|---|---|
| NODE 4 ⇒ | Feb | 8 |
| NODE 4 ⇒ | Jan | 4 |

NODE 2

| | month | sold |
|---|---|---|
| NODE 1 ⇒ | Apr | 3 |
| NODE 1 ⇒ | Mar | 4 |
| NODE 1 ⇒ | Apr | 9 |
| NODE 1 ⇒ | Mar | 8 |
| NODE 1 ⇒ | Mar | 6 |
| NODE 2 ⇒ | Mar | 1 |
| NODE 2 ⇒ | Apr | 3 |
| NODE 2 ⇒ | Mar | 6 |
| NODE 3 ⇒ | Apr | 8 |
| NODE 3 ⇒ | Mar | 8 |
| NODE 3 ⇒ | Apr | 3 |
| NODE 3 ⇒ | Mar | 3 |
| NODE 3 ⇒ | Apr | 1 |
| NODE 3 ⇒ | Apr | 9 |
| NODE 3 ⇒ | Mar | 1 |
| NODE 4 ⇒ | Apr | 8 |
| NODE 4 ⇒ | Mar | 3 |
| NODE 4 ⇒ | Mar | 5 |

NODE 3

| | month | sold |
|---|---|---|
| NODE 1 ⇒ | Jun | 2 |
| NODE 1 ⇒ | May | 4 |
| NODE 2 ⇒ | May | 2 |
| NODE 2 ⇒ | May | 7 |
| NODE 3 ⇒ | May | 8 |
| NODE 4 ⇒ | Jun | 3 |

NODE 4

| | month | sold |
|---|---|---|
| NODE 1 ⇒ | Aug | 4 |
| NODE 1 ⇒ | Jul | 1 |
| NODE 2 ⇒ | Jul | 6 |
| NODE 2 ⇒ | Aug | 9 |
| NODE 2 ⇒ | Jul | 2 |
| NODE 2 ⇒ | Aug | 9 |
| NODE 3 ⇒ | Aug | 7 |
| NODE 4 ⇒ | Jul | 9 |
| NODE 4 ⇒ | Aug | 9 |
| NODE 4 ⇒ | Aug | 6 |

F I G. 30

NODE 1

| month | sold |
|-------|------|
| Sun   | 3    |
| Sun   | 4    |
| Mon   | 2    |
| Fri   | 4    |
| Wed   | 4    |
| Sun   | 1    |
| Tue   | 9    |
| Sat   | 8    |
| Sat   | 6    |

⇒ NODE 4
⇒ NODE 4
⇒ NODE 1
⇒ NODE 3
⇒ NODE 2
⇒ NODE 4
⇒ NODE 1
⇒ NODE 3
⇒ NODE 3

NODE 2

| month | sold |
|-------|------|
| Wed   | 6    |
| Thu   | 1    |
| Mon   | 2    |
| Fri   | 9    |
| Thu   | 7    |
| Mon   | 3    |
| Thu   | 6    |
| Sat   | 2    |
| Sun   | 9    |

⇒ NODE 2
⇒ NODE 2
⇒ NODE 1
⇒ NODE 3
⇒ NODE 2
⇒ NODE 1
⇒ NODE 2
⇒ NODE 3
⇒ NODE 4

NODE 3

| month | sold |
|-------|------|
| Sat   | 7    |
| Tue   | 8    |
| Thu   | 8    |
| Fri   | 8    |
| Tue   | 3    |
| Tue   | 3    |
| Thu   | 1    |
| Sat   | 9    |
| Wed   | 1    |

⇒ NODE 3
⇒ NODE 1
⇒ NODE 2
⇒ NODE 3
⇒ NODE 1
⇒ NODE 1
⇒ NODE 2
⇒ NODE 3
⇒ NODE 2

NODE 4

| month | sold |
|-------|------|
| Wed   | 9    |
| Sat   | 9    |
| Sun   | 8    |
| Sat   | 3    |
| Fri   | 6    |
| Wed   | 8    |
| Sat   | 4    |
| Tue   | 3    |
| Sat   | 5    |

⇒ NODE 2
⇒ NODE 3
⇒ NODE 4
⇒ NODE 3
⇒ NODE 3
⇒ NODE 2
⇒ NODE 3
⇒ NODE 1
⇒ NODE 3

FIG. 31

NODE 1

|  | month | sold |
|---|---|---|
| NODE 1 ⇒ | Mon | 2 |
| NODE 1 ⇒ | Tue | 9 |
| NODE 2 ⇒ | Mon | 2 |
| NODE 2 ⇒ | Mon | 3 |
| NODE 3 ⇒ | Tue | 8 |
| NODE 3 ⇒ | Tue | 3 |
| NODE 3 ⇒ | Tue | 3 |
| NODE 4 ⇒ | Tue | 3 |

NODE 2

|  | month | sold |
|---|---|---|
| NODE 1 ⇒ | Wed | 4 |
| NODE 2 ⇒ | Wed | 6 |
| NODE 2 ⇒ | Thu | 1 |
| NODE 2 ⇒ | Thu | 7 |
| NODE 2 ⇒ | Thu | 6 |
| NODE 3 ⇒ | Thu | 8 |
| NODE 3 ⇒ | Thu | 1 |
| NODE 3 ⇒ | Wed | 1 |
| NODE 4 ⇒ | Wed | 9 |
| NODE 4 ⇒ | Wed | 8 |

NODE 3

|  | month | sold |
|---|---|---|
| NODE 1 ⇒ | Fri | 4 |
| NODE 1 ⇒ | Sat | 8 |
| NODE 1 ⇒ | Sat | 6 |
| NODE 2 ⇒ | Fri | 9 |
| NODE 2 ⇒ | Sat | 2 |
| NODE 3 ⇒ | Sat | 7 |
| NODE 3 ⇒ | Fri | 8 |
| NODE 3 ⇒ | Sat | 9 |
| NODE 4 ⇒ | Sat | 9 |
| NODE 4 ⇒ | Sat | 3 |
| NODE 4 ⇒ | Fri | 6 |
| NODE 4 ⇒ | Sat | 4 |
| NODE 4 ⇒ | Sat | 5 |

NODE 4

|  | month | sold |
|---|---|---|
| NODE 1 ⇒ | Sun | 3 |
| NODE 1 ⇒ | Sun | 4 |
| NODE 1 ⇒ | Sun | 1 |
| NODE 2 ⇒ | Sun | 9 |
| NODE 4 ⇒ | Sun | 8 |

F I G. 32

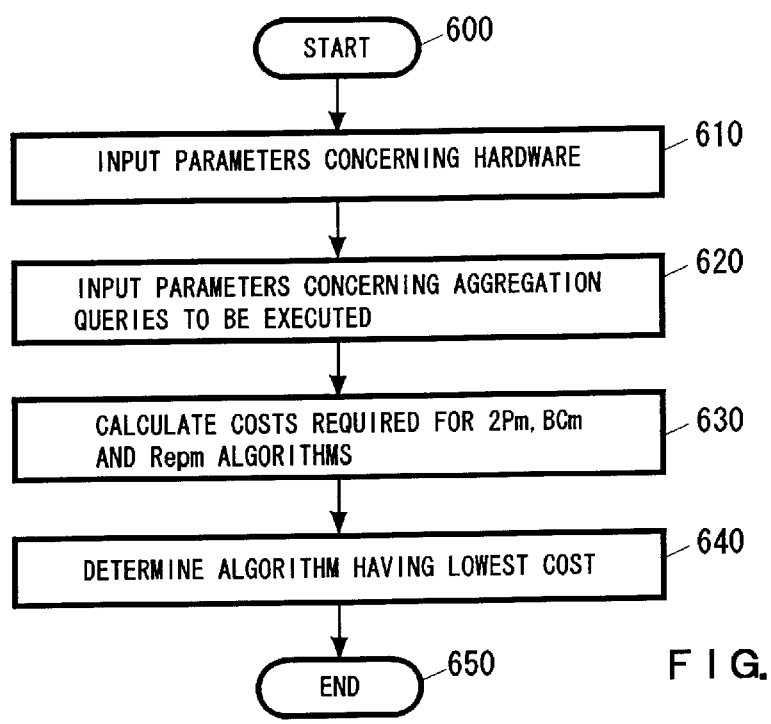
F I G. 33
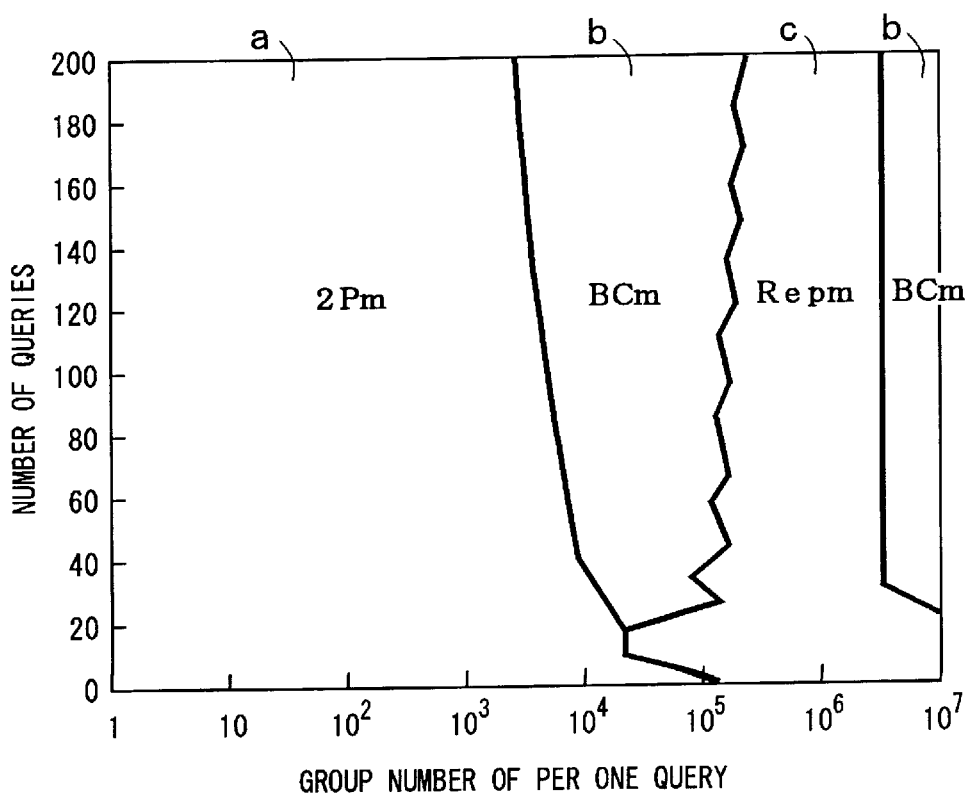
F I G. 34

METHOD FOR EXECUTING AGGREGATE QUERIES, AND COMPUTER SYSTEM

BACKGROUND OF THE INVENTION

1. Field of the Invention

The present invention relates to a method for processing aggregate queries on a parallel computer system, that are required for a database processing, such as Data Mining. The aggregate query or aggregation includes a query of aggregation for each group in the database.

2. Related Art

The aggregation used in a field, such as Data Mining, is a process for calculating the total value, or the maximum value, or the minimum value, or the average value of one attribute relative to a certain relation in the database every group, like "group-by" in the structured query language, SQL, to the relational database. The group is defined as records whose another attribute has the same value or the same value set, or a value that is inside a predetermined range. This aggregation is recently indispensable to a decision support system, such as OLAP (On Line Analytical Processing) (for details, see "Beyond Decision Support," E. F. Codd, S. B. Codd and C. T. Salley, Computerworld, 27(30), Jul. 1993) and Data Mining.

An example aggregation will now be explained. Table 1 shows the relation stored in a database. In Table 1, product numbers, customer numbers and sales are entered in that separate columns, and each time the sale occurs, a tuple is filled. Assume a calculation for counting the sales for each product number in this relation. For this calculation, a group is formed for each product number, and the total is calculated for each group. This is one example of the above described aggregation. When the aggregation is executed, the results shown in Table 2 are obtained.

TABLE 1

| product # | customer # | sold |
|---|---|---|
| G1 | C1 | 3 |
| G1 | C2 | 10 |
| G2 | C2 | 5 |
| G2 | C3 | 10 |
| G3 | C4 | 2 |

TABLE 2

| product # | sold |
|---|---|
| G1 | 13 |
| G2 | 15 |
| G3 | 2 |

Algorithms for parallel processing for one aggregation have been studied, and these algorithms will now be described. It should be noted that, for each algorithm, the entire relation in a database is divided equally for each processor.

1. 2P Algorithm

Since this algorithm is performed in two phases, it is called 2P.

(1) As a first phase, each processor (also called a node) performs an aggregation for a corresponding disk drive (some part of a database is stored thereon).

(2) As a second phase, the results of the respective processors are collected by a totaling processor to obtain the final result.

This method is also described in Japanese Unexamined Patent Publication No. Hei 5-2610. In this publication, an aggregation for only one group is performed, and no consideration is given for aggregation for a plurality of groups, such as in Data Mining described above.

2. Rep Algorithm

The repartition algorithm is performed according to the following algorithm (FIG. 1).

(1) First, it is determined for which group each node performs the aggregation (step 110). In the example in Table 1, it is determined that a node 1 will handle product number G1 and a node 2 will handle product number G2.

(2) Then, each node reads part of data from a corresponding disk drive (a database is stored therein). If the read part is data for a group for which another node is to perform aggregation, the read part is transmitted to the responsible node (step 120). In the example in Table 1, if Table 1 is present on the disk drive for node 1, when node 1 reads the third tuple in Table 1 it will transmit the data in the third tuple to node 2.

(3) Finally, each node performs aggregation for the group to be aggregated in that node, including the data transmitted by the other nodes (step 130).

It is different which algorithm is faster depending on the conditions. FIG. 2 shows an estimate of the period of time required for the performance of one aggregation using each algorithm. The estimate in FIG. 2 was obtained with an IBM SP2 having 16 nodes (SP2 is a trademark of International Business Machines Corp.), and indicates the relationship existing between the number of groups and the response time. In this system, when the number of groups is smaller than $2 \times 10^5$, the 2P algorithm provides faster processing. When the number of groups is greater, the Rep algorithm provides faster processing. An algorithm for dynamically switching the 2P algorithm and the Rep algorithm has been proposed (for example, see "Adaptive Parallel Aggregation Algorithms," Ambuj Shatdal and Jeffrey F. Naughton, in Proceedings Of The ACM SIGMOD Conference On The Management of Data, pp. 104–114, May 1995).

Another method is a method that involves the broadcasting of all the records in a database (see "Parallel Algorithms For The Execution Of Relational Database Operations," Dine Bitton, Haran Boral, David J. DeWitt and W. Kevin Wilkinson, ACM Trans. on Database Systems, 8(3) :324–353, Sep. 1983). Such an algorithm (hereinafter called a BC algorithm), however, is impractical when a network for connecting processors is slow.

The BC algorithm will be generally explained below.

3. BC algorithm (1) It is determined for which group in all the groups, each node performs the aggregation. This is the same as for the Rep algorithm.

(2) Each node broadcasts all the data on its disk drive to all the other nodes.

(3) Each node performs an aggregation for responsible groups relative to the broadcast data (including data on the disk drive of that node).

The algorithms with which one aggregation is performed in parallel have been explained. When one processor is used to perform a plurality of aggregations, a method has been employed for increasing the speed for the entire processing that is performed by adjusting the order of the calculations or by employing the correlation of calculations (see, for example, "On The Computation Of Multidimensional Aggregates," Sameet Agrawal, Rakesh Agrawl, Prasad M. Deshpande, Ashish Gupta, Jeffrey F. Naughton, Raghu Ramakrishnan and Sunita Sarawagi, In proceedings of the 22nd VLDB Conference, Sep. 1996). However, a method for simultaneously processing a plurality of aggregations by using a parallel computer has not been proposed.

A process for performing a plurality of aggregations in parallel can not always be performed at a high speed by repeating the above described method multiple times. It is, therefore, one object of the present invention to provide a method for performing a plurality of aggregations in parallel and at a high speed.

A plurality of aggregations must be performed for OLAP and for Data Mining, which are technical cores for a decision support system on which interest has recently been focused. For example, a Data Cube operator for performing a plurality of aggregations, relative to the analysis of data having a multiple-dimensional attribute, has been proposed (for example, see "Data Cube: A Relational Aggregation Operator Generalizing Group-by, Cross-by and Sub-by, and Sub-totals," Jim Gray, Adam Bosworth, Andrew Layman and Hamid Pirahesh, Technical Report, Microsoft, November 1995). An application of Data Mining automatically finds the relationship between the attributes by using the results obtained by a plurality of aggregations and then prepares a graphical display (for example, see "Data Mining Optimized Association Rules For Numeric Attributes," Takeshi Fukuda, Yasuhiko Morimoto, Shinichi Morishita and Takeshi Tokuyama, in Proceedings Of The Fifteenth ACM SIGACT-SIGMOD-SIGART Symposium On Principles Of Database Systems, pp. 182–191, June 1996, and "Data Mining Using Two-Dimensional Optimized Association Rules: Scheme, Algorithm And Visualization," Takeshi Fukuda, Yasuhiko Morimoto, Shinichi Morishita and Takeshi Tokuyama, in Proceedings Of The ACM SIGMOD Conference On Management Of Data, pp. 13–23, June 1996). In these techniques, the interactive operations are required and the response time is an important element. To reduce the response time, the advance performance of aggregation is considered as one method. Thus, it is another object of the present invention to increase the speed for the execution of OLAP and Data Mining by performing a plurality of aggregations in parallel and at a high speed.

It is an additional object of the present invention to switch methods for executing a plurality of aggregations, depending on hardware conditions and on the properties of a plurality of aggregations, so that under various conditions the plurality of aggregations can be executed at a higher speed than by using the same method constantly.

SUMMARY OF THE INVENTION

The most important technical matters for achieving the above objects are the number of accesses and the period of time required to access to a disk drive. At present, the access speed for a disk drive is slower than the transmission speed for communication between processors in a parallel processor system. A reduction in the access to a disk device greatly affects the achievement of the objects of the present invention. A specific method for reducing the number of accesses to the disk device will now be described.

A first aggregation execution method according to the present invention comprises the steps of: (a) ensuring space for storing results of M aggregate queries of N aggregate queries (M is an integer equal to or less than N) in a memory area for that processor in each processor; (b) executing the M aggregate queries together for the part of database for itself in each processor; (c) transmitting the results of the M aggregate queries executed by each processor to a processor for counting up in each processor, and calculating a final result in the processor for counting up; and (d) iterating the steps (a) to (c) until execution of the N aggregate queries is completed. A computer system for performing the aggregation execution method of the present invention is so designed that a plurality of processors connected by a network can use its memory area (memory area for itself) and its part of database (a part of database for itself or a partial database), which include data that can be divided into one or a plurality of groups. The memory may be prepared separately for each node, or memory connected to a network may be divided into several memory areas that are employed by individual processors. The same configuration can be applied for a disk.

The first aggregation execution method is provided based on the 2P algorithm described in the description of the background. According to this method, the calculation speed of the previously employed IBM SP2 is increased when the number of the resultant groups is relatively small.

The step (b) includes the steps of: (b1) in each processor, reading a part of a partial database into a work space of the memory area for itself, wherein the partial database is a part of the database for itself; (b2) in each processor, executing the M aggregate queries for results of calculations that were performed at previous steps and stored in the memory area for itself and the read part of the partial database; and (b3) iterating the steps (b1) and (b2) until execution of the M aggregate queries is completed for all of the database. At step (b2), M aggregate queries can be performed only for the read part of the partial database, and then the sum of the current results and the previously obtained results can be calculated. This method, however, reduces the processing speed.

M can be an integer equal to N or smaller, and can be selected regardless of other conditions. However, if M is determined from an amount of space which can be acquired into the memory area for storage of the results of the calculation of the aggregation, the number of steps (step (d)) to be repeated is smaller, and the processing speed can be increased.

A second aggregation execution method according to the present invention comprises the steps of: (a) in each processor, ensuring space for storing results of Q aggregate queries to be executed in that processor of P aggregate queries in the memory area for itself; (b) executing the Q aggregate queries for data in the entire database in each processor by iterating a step of reading a part of the partial database into the memory area for itself in each processor and a step of broadcasting the read part of the partial database via the network in each processor; and (c) iterating the steps (a) and (b) until execution of the P aggregate queries is completed. A computer system for the second aggregation execution method is the same as that for the first aggregation execution method.

The second aggregation execution method is provided based on the BC algorithm. With this method, when the number of groups is larger than that for the first aggregation execution method, the calculation speed is increased.

The step (a) in the second aggregation execution method can comprise the steps of: (a1) checking whether space in which a result of an execution of one aggregate query is stored is present in the memory area for one processor; (a2) acquiring the space for the result of the execution of the one aggregate query when the space is present; (a3) when the space is not present, checking whether the space in which the result of the execution of the one aggregate query is stored is present in the memory area for another processor; and (a4) acquiring the space for the result of the execution of the one aggregate query when the space is present in the another processor; and wherein, when the space is not present in the memory area for the another processor, the one aggregate query is executed in a succeeding iteration process. Even when a case occurs where no space is present for a certain aggregation, the aggregation can be performed by dividing it into several parts.

As well as M, Q can be determined from an amount of space which can be acquired into the memory area for storage of the results of the calculation of the aggregation.

The step (b) in the second aggregation execution method can comprise the steps of: (b1) in each processor, reading a part of the partial database to a work space of the memory area for itself; (b2) broadcasting the read part of the partial database via the network; (b3) executing the Q aggregate queries for results of calculations that were performed at previous steps and stored in the memory area for itself and the read part of the partial database and data transmitted from other processors; and (b4) iterating the steps (b1) to (b3) until each processor completes execution of the Q aggregate queries for all data in the database. At step (b3), the execution of the Q aggregations may be executed for the read part of the partial database and data that are received from another processor and then the obtained result and the previously obtained results may be added. This method, however, reduces the processing speed.

The third aggregation execution method in the present invention comprises the steps of: (a) determining T aggregate queries to be executed of S aggregate queries; (b) determining which processor aggregates each group of each of the T aggregate queries, wherein each group is to be aggregated when the T aggregate queries are executed; (c) in each processor, reading out a part of the partial database into the memory area for itself, and transmitting data associated with a group to be aggregated in another processor of an aggregate query in the read data to the another processor via the network with the aggregate query's ID, and executing the aggregate queries for data associated with groups to be aggregated in that processor of the T aggregate queries; (d) iterating the step (c) until each processor completes the execution of the T aggregate queries for all data associated with groups to be aggregated in that processor of the T aggregate queries; and (e) iterating the steps (a) to (d) until the execution of the S aggregate queries is completed. A computer method for the third aggregation execution method is the same as that for the first aggregation execution.

The third aggregation execution method is provided based on the Rep algorithm. When the number of groups is relatively larger than the number in which the second aggregation execution method should be used, speed of the third method becomes faster.

The step (c) in the third aggregation execution method comprises the steps of: (c1) in each processor, reading a part of the partial database into a work area in the memory area for itself; (c2) in each processor, determining which processor needs each portion of read data, transmitting the portion with an ID of an aggregate query associated with the portion to the needing processor via the network; and (c3) in each processor, executing the T aggregate queries for data associated with groups to be aggregated in that processor in the read data and data transmitted from other processors and results of calculations which were performed at the previous steps and stored in the memory area for itself. The transmission via the network may be performed with the execution of the T aggregate queries, simultaneously.

A method for determining the T aggregate queries and a method for determining how processor is assigned to each of groups of the aggregate queries in the third aggregation execution method depend on the memory space which is used by each processor.

Among the first to third aggregation execution method, the optimal algorithm differs depending on the conditions. When the optimal algorithm is selected by employing a parameter of the computer system, which may include the number of processors, the size of the database and the network communication speed, and a parameter, concerning the property of an aggregation operation, that includes the memory capacity for storing the results of aggregations, and then the plurality of aggregations are executed by the selected algorithm, a user can rapidly obtain results for the plurality of aggregations, usually. Note the selection from the three methods is one example. It may be selected from a group of methods which include the three methods or from any subset of the three methods.

The above described methods can be provided by a program or by using a special apparatus. For one having ordinary skill in the art who understands the following explanation, it would be easy to modify the implementation of the present invention as described a above.

BRIEF DESCRIPTION OF THE DRAWINGS

FIG. 6 is a flowchart showing the processing for the 2Pm algorithm.

FIG. 7 is a diagram showing the contents of a database of a processor element 1.

FIG. 8 is a diagram showing the contents of a database of a processor element 2.

FIG. 9 is a diagram showing the contents of a database of a processor element 3.

FIG. 10 is a diagram showing the contents of a database of a processor element 4.

FIG. 11 is a diagram illustrating the intermediate results held by the memory of the processor element 1 that is executing the second step in the 2Pm algorithm for the database in FIG. 7.

FIG. 12 is a diagram illustrating the results held by the memory of the processor element 1 that has executed the second step of the 2Pm algorithm for the database in FIG. 7.

FIG. 13 is a diagram illustrating the results held by the memory of the processor element 2 that has executed the second step of the 2Pm algorithm for the database in FIG. 8.

FIG. 14 is a diagram illustrating the results held by the memory of the processor element 3 that has executed the second step of the 2Pm algorithm for the database in FIG. 9.

FIG. 15 is a diagram illustrating the results held by the memory of the processor element 4 that has executed the second step of the 2Pm algorithm for the database in FIG. 10.

FIG. 16 is a diagram illustrating the results held by the memory of the processor element 1 that has executed the totaling process of the 2Pm algorithm.

FIG. 17 is a diagram illustrating the results held by the memory of the processor element 2 that has executed the totaling process of the 2Pm algorithm.

FIG. 18 is a diagram illustrating the results held by the memory of the processor element 3 that has executed the totaling process of the 2Pm algorithm.

FIG. 19 is a diagram illustrating the results held by the memory of the processor element 4 that has executed the totaling process of the 2Pm algorithm.

FIG. 20 is a flowchart showing the processing for the BCm algorithm.

FIG. 22 is a diagram showing the results held by the memory of the processor element 2 that has executed the BCm algorithm for the databases in FIGS. 7 to 10.

FIG. 23 is a diagram showing the results held by the memories of the processor elements 1, 3 and 4 that have executed the BCm algorithm.

FIG. 25 is a drawing showing the intermediate state where the processor element 3 executes the query 1 and 2 by the Repm algorithm.

FIG. 26 is a drawing showing the intermediate state where the processor element 3 executes the query 1 and 2 by the Repm algorithm.

FIG. 27 is a drawing showing the intermediate state where the processor element 3 executes the query 1 and 2 by the Repm algorithm.

FIG. 28 is a drawing showing the intermediate state where the processor element 3 executes the query 1 and 2 by the Repm algorithm.

FIG. 29 is a drawing showing data associated with the query 1 and the destination processor element of the data transmitted from each processor element when executing the query 1 and 2 by the Repm algorithm.

FIG. 30 is a drawing showing data associated with the query 1 and the source processor element of the data received in each processor element when executing the query 1 and 2 by the Repm algorithm.

FIG. 31 is a drawing showing data associated with the query 2 and the destination processor element of the data transmitted form each processor element when executing the query 1 and 2 by the Repm algorithm.

FIG. 32 is a drawing showing data associated with the query 2 and the source processor element of the data received in each processor element when executing the query 1 and 2 by the Repm algorithm.

FIG. 33 is a flowchart for selecting an optimal algorithm from the 2Pm, BCm and Repm algorithms.

FIG. 34 is a graph indicating positions at which the optimal algorithm is changed when an IBM SP2 having 16 nodes executes aggregate queries.

DESCRIPTION OF THE PREFERRED EMBODIMENTS

Figure 1:
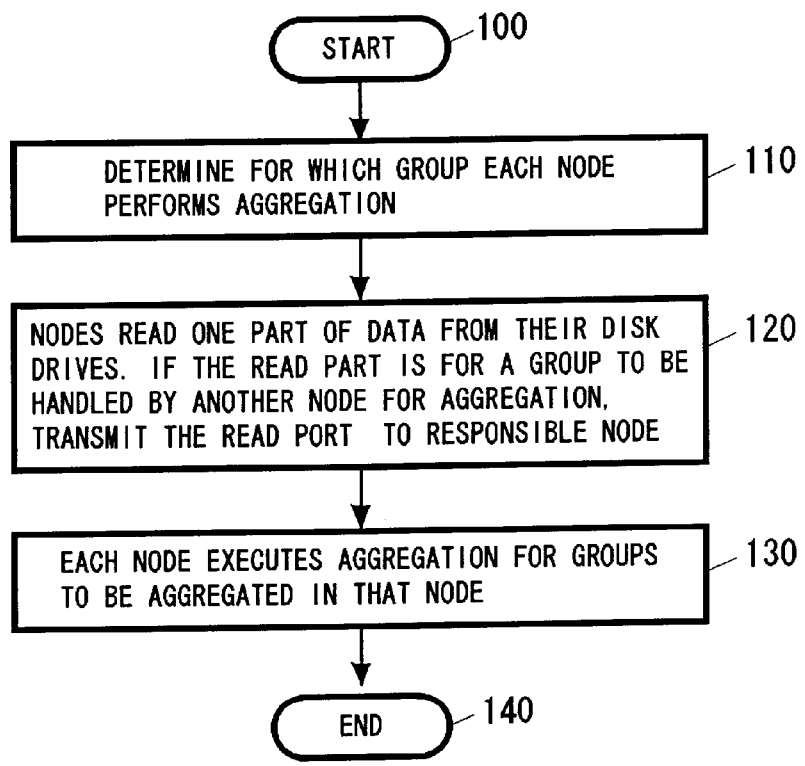
FIG. 1 is a flowchart showing the processing for the Rep algorithm.
Figure 2:
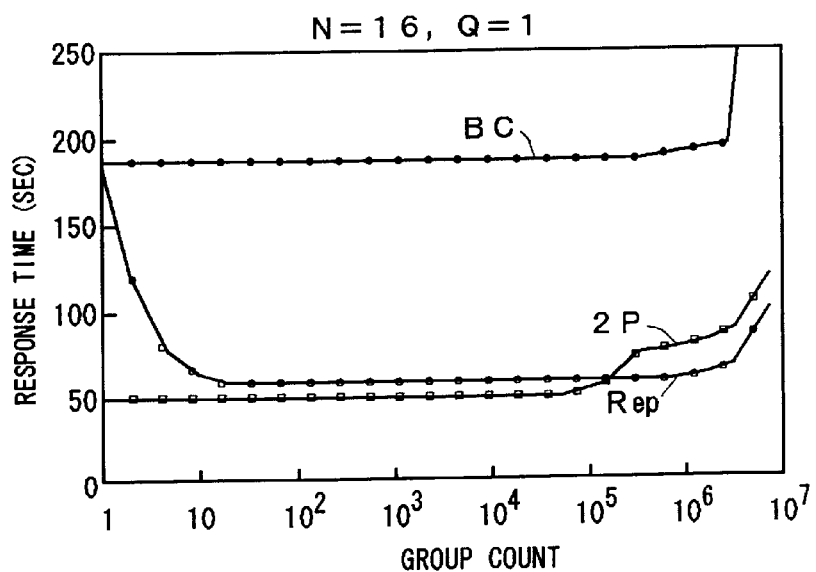
FIG. 2 is a graph showing the relationship between the number of groups and the response time for the 2P algorithm, the Rep algorithm and the BC algorithm.
Figure 3:
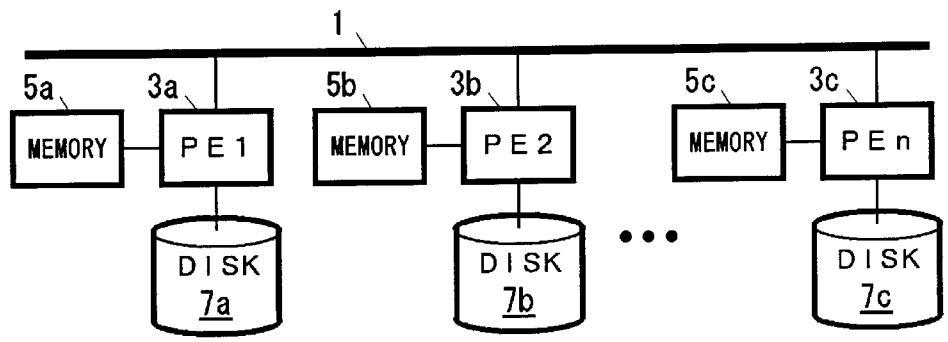
FIG. 3 is a diagram showing an example arrangement of a computer system employed for the present invention.

First, the hardware arrangement of a computer system employed for the present invention will be described. FIG. 3 is a diagram showing one example of the hardware arrangement. A processor element PE1 (3a), a processor element PE2 (3b) and a processor element PEn (3c) are connected via a network 1. The number of processor elements is not necessarily limited to three, as in FIG. 3, and it is only necessary that more than one processor element be provided. In general, n processor elements are assumed to be provided. A memory 5a and a disk drive 7a are connected to the processor element PE1 (3a), a memory 5b and a disk drive 7b are connected to the processor element PE2 (3b), and a memory 5c and a disk drive 7c are connected to the processor element PEn (3c). One part of a database is stored in each disk drive. The network 1 is employed for communication among the processor elements, which can exchange data at high speed across the network 1.

Figure 4:
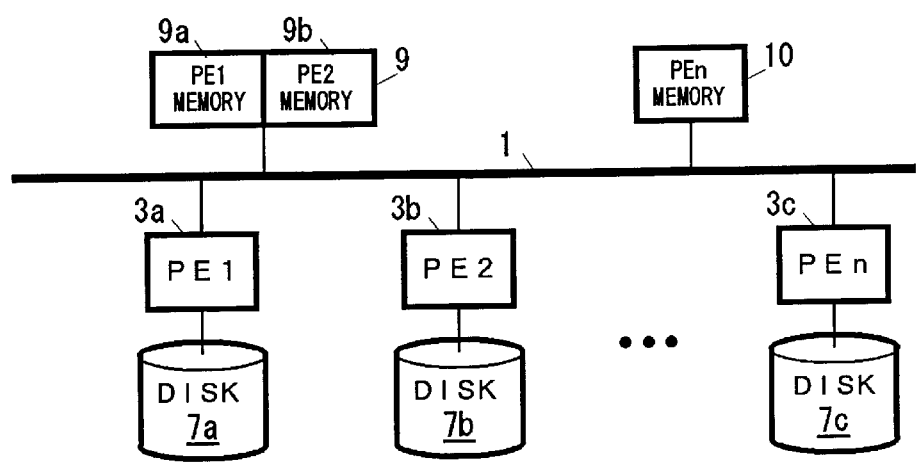
FIG. 4 is a diagram showing another example arrangement of the computer system employed for the present invention.

The arrangement in FIG. 3 is merely an example, and another example arrangement shown in FIG. 4 may be employed wherein memories are not directly connected to respective processor elements, and memories 9 and 10 are connected to a network 1. In this arrangement, the memory 9 can be divided into an area 9a for the processor element PE1 and an area 9b for the processor element PE2. In addition to the areas for the respective processor elements, an area used in common by the processor elements may be provided in the memory 9. Like the memory 10 that is used only for the processor element PEn, separate memories for individual processor elements can be connected to the network 1. The processor elements 3a, 3b and 3c read data from the disk drives 7a, 7b and 7c, and write the data, via the network 1, to work areas in their memory areas 9a, 9b and 10.

Figure 5:
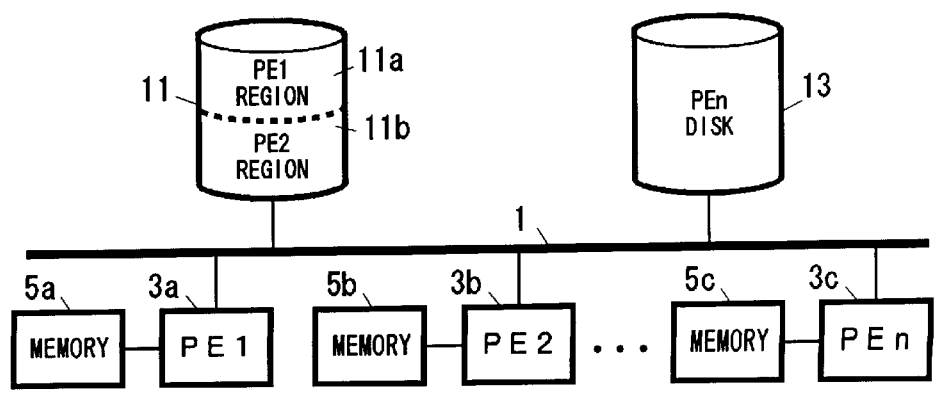
FIG. 5 is a diagram showing an additional example arrangement of the computer system employed for the present invention.

As an additional arrangement shown in FIG. 5, while processor elements and memories are connected in the same manner as shown in FIG. 3, disk drives are connected to a network 1. A disk drive 11 includes data 11a for a processor element PE1 and data 11b for a processor element PE2. The disk drive 11 can include common data, in addition to the data for the processor elements PE1 and PE2. Data for a processor element PEn is stored in a disk drive 13. As in the arrangement shown in FIG. 5, a disk drive for each processor element can be separately connected to the network 1. The data on the disk drives are read, via the network 1, by the processor elements 3a, 3b and 3c, and are fetched in the work areas of memories 5a, 5b and 5c.

A combination of some of the arrangements in FIGS. 3, 4 and 5 can be employed. For example, several processor elements can be arranged as shown in FIG. 3, and the other processor elements can be arranged as shown in FIG. 4 or FIG. 5. An arrangement other than those in FIGS. 3, 4 and 5 can also be employed. In short, the memories and the disk drives need not necessarily be used in common by the processors.

The processing on the above described arrangement will now be described. The following processing partially includes the process for the entire system. One of the processor elements may be assigned for the performance of that process, or a dedicated processor for performing that process may be prepared.

1. 2Pm algorithm (FIG. 6)

Since this algorithm is provided based on the 2P algorithm described in the background explanation, and is an algorithm that is expanded in order to perform a plurality of aggregations in parallel, it is called the 2Pm algorithm. To perform a plurality of aggregations, the processing speed is increased by reducing the number of accesses to the disk drive to the minimum. It should be noted that a total of N aggregate queries are to be executed.

(1) First, a space for storing the results of the execution of M aggregate queries is obtained in a memory area for each processor element (step 210). M is so determined that it falls in a range within which the results of the aggregations can be stored in a memory area for each processor element. Since the execution of more aggregations at one time allows the disk access to be shared, the processing speed is increased. In addition, the processing can be performed at a higher speed when all of the processor elements that execute this algorithm perform the same M aggregate queries. This is because a totaling process, which will be described later, is required, and if a different number of aggregate queries were performed for each processor element, a part of the results that could not be counted (or totaled) would remain in the memory, and the termination of the execution in another processor element would have to be waited for. Therefore, if the number of aggregate queries is selected from the viewpoint that the processor elements that will execute this algorithm will perform the same number of aggregate queries at the same time, this is effective for fast processing. Although the space for storing the results of the aggregations must be determined before the aggregations are performed, the size required for the results can be obtained by performing a trial calculation for a small amount of data. This process is not heavy burden.

Pseudo code at step 210 are shown below.

TABLE 3

```
// variables
N         : number of node
mem       : size of memory
MEM       : variable ( 0 ≦ MEM ≦ mem )
q         : query
NL        : list of queries
tmpNL     : list of queries # for subsequent processing
ML        : list of queries # for this processing
// initialization
NL = { q_1, q_2, . . . , q_i, . . . , q_Q } # list of Q queries.
mem = getMaxMemSize( )   # Acquiring memory size.
    # Each node adjusts the size to the
    # minimum size in all nodes in cooperation.
    # Each node executes the following steps.
while NL ≠ NIL and tmpNL ≠ NIL do    # NIL : null list
    begin
        MEM = mem ;
        tmpNL = NIL ;
        ML = NIL ;
        while NL ≠ NIL do       # Execute until NL becomes null.
            begin
                q = pop( NL );       # Acquiring the head of pop( ) list.
                if ( MEM > |q| ) then   # Check whether the memory for the
                                        # query q is ensured.
                begin                   # |q| is a memory size used by the
                                        # query q.
                    append( ML, q ) ;   # Add q to ML.
                    MEM = MEM − |q| ;   # Subtract |q| from residual capacity
                                        # of the memory.
                end
                else
                    begin
                        append( tmpNL, q ) ;
                                        # Add query q to the unprocessed list.
                    end
            end
        # Execute queries in ML.
        # Execute queries in tmpNL in the subsequent processing.
        while ML ≠ NIL do       # Execute until ML becomes NIL.
            begin
                q = pop( ML ) ;     # Acquire the head query from ML.
                allocate ( q ) ;    # Allocate memory area for query q.
            end
        2Pm( ) ;                    # For queries in the list ML, execute
                                    # 2Pm algorithm.
        copy( NL, tmpNL ) ;         # Copy tmpNL to NL.
end
```

(2) M aggregate queries are performed for part of the database for each processor element (step 220). More specifically, in this process, first, data to be processed at this time in part of the database for each processor element are read to a work space in the memory area of the processor element. M aggregate queries are executed for the previously obtained results (not present at the first step), which are stored in the memory area, and data that is currently to be processed, which are read from the part of the database for that processor element. These two steps are repeated until the aggregation is performed for the entire part of the data-base. A specific example will be described later. Since with a conventional method only one aggregation is performed for data that are read once, when this conventional method is applied for the execution of M aggregate queries, data must be read M times. On the other hand, according to the present invention, since M aggregate queries are executed for data that are read once, the period of time required for disk accesses is reduced to 1/M.

(3) The result obtained by execution of M aggregate queries is transmitted to a totaling processor element (also called a totaling node), which then calculates the final result (step 230). One or a plurality of totaling processor elements may be provided. When, for example, M processor elements perform this algorithm, each processor may serve as a processor element for counting the result of one aggregation to obtain the final result. When the number of processor elements is smaller than M, each processor element may count the results obtained by execution of a plurality of aggregate queries, or only one processor element may count all the results obtained by execution of M aggregate queries. It should be determined in advance which processor element counts the results of which aggregate queries.

As another totaling method, individual groups in the results obtained by the execution of aggregations, are assigned for processor elements, which in turn count the results. For example, processor element 1 counts groups 1 and 2, relative to aggregation 1; and processor element 2 counts groups 3 and 4, relative to aggregation 1, and groups 1 and 2, relative to aggregation 2.

(4) When the final result for the execution of M aggregate queries is acquired, a check is performed to determine whether or not the execution of N aggregate queries is completed (step 240). When not all the N aggregate queries has been executed, program control returns to step 210 and the above described process is repeated. In this case, normally, the process is repeated by using an M that differs from the previous M. When the N aggregate queries have been executed, the process is thereafter terminated.

An execution example will now be explained referring to FIGS. 7 through 10. The relation stored on a disk drive for the processor element 1 is shown in FIG. 7; the relation stored on a disk drive for the processor element 2 is shown in FIG. 8; the relation stored on a disk drive for the processor element 3 is shown in FIG. 9; and the relation stored on a disk drive for the processor element 4 is shown in FIG. 10. Four processor elements are present in a computer system. The columns in tables represent, from the left, month, day, week, location, shop number, product number and the amount of sold. The tuples in the tables are filled in when a sale occurs.

Assume that a query (query 1) for adding the amount sold by the month, a query (query 2) for adding the amount of sold by day of the week, a query (query 3) for adding the amount of sold by location, a query (query 4) for adding the amount of sold by product number, and a query (query 5) for adding the amount of sold by location and week are to be performed at one time.

The processor element 1 reads the data in the first tuple in FIG. 7 from the disk drive to the work space in the memory.

To perform the query 1, the columns for the month and the amount of sold are referred to. Month "Apr" and the amount of sold "3" are stored as a result of the query 1. Then, to perform query 2, the columns for the week and the amount of sold are referred to, and day of the week "Sun" and the amount of sold "3" are stored as a result of the query 2. The columns for the location and the amount of sold are then referred to in order to perform query 3, and location "Kyuushuu" and the amount of sold "3" are stored as a result of the query 3. After that the columns for the product number and the amount of sold are referred to in order to execute query 4, and product number 2 and the amount of sold "3" are entered as a result of the query 4. Then, the columns for the location, the week and the amount of sold are referred to in order to execute query 5, and the location "Kyuushuu," the day of week "Sun" and the amount of sold "3" are entered as a result of the query 5.

Then, the processor element 1 reads data in the second tuple in FIG. 7 from the disk drive to the work space in the memory. The columns for the month and the amount of sold are referred to in order to perform the query 1. Since the read data for the month differs from the previously stored result for the month obtained by the first execution of the query 1, the month "Aug" and the amount of sold "4" are added to the result the performed by the query 1. Then, the columns for the week and the amount of sold are referred to in order to perform the query 2. Since the read data for the week is the same as the data for the week previously obtained by the query 2, the amount of sold "4" is added to the result in the week "Sun" obtained by the query 2, then enters "17". The columns for the location and the amount of sold are referred to in order to perform the query 3. Since the data for the location that is read differs from the previously stored result for the location obtained by the query 3, the location "Hokkaido" and the amount of sold "4" are added to the result obtained by the query 3. After that the columns for the product number and the amount of sold are referred to in order to perform the query 4. Since the data for the product number that is read differs from the previously stored product number obtained by the query 4, the product number "1" and the amount of sold "4" are added to the result obtained by the query 4. Then the columns for the location, the week and the amount of sold are referred to in order to perform the query 5. Since the read data for the location and the day differ from the previously stored data for the location and the day obtained by the query 5, the location "Hokkaido" and the day "4" are added to the result obtained by the query 5.

Following this, the processor element 1 reads data in the third tuple in FIG. 7 from the disk drive to the work space in the memory. The columns f or the month and the amount of sold are referred to in order to perform the query 1. Since the read data for the month differs from the result for the month previously obtained by the query 1, the month "Jun" and the amount of sold "2" are added to the result obtained by the query 1. Then, the columns for the week and the amount of sold are ref erred to in order to perform the query 2. Since the read data for the week differs from data for the day previously obtained by the query 2, the week "Mon" and the amount of sold "2" are entered. The columns for the location and the amount of sold are referred to in order to perform the query 3. Since the read data for the location is the same as the data for the location obtained by the query 3, the location "Hokkaido" and the amount of sold "6," which is obtained by adding "2" to the amount of sold "4," are entered. After this the columns for the product number and the amount of sold are referred to in order to perform the query 4. Since the read data for the product number is the same as the product number obtained by the query 4, "2" is added to the amount of sold "4," and the product number "1" and the amount of sold "6" are entered. Then the columns for the location, the week and the amount of sold are referred to in order to perform the query 5. Since the read data for the location and the week differ from the data for the location and the day previously obtained by the query 5, the location "Hokkaido," the week "Mon," and the amount of sold "2" are entered.

In this process, the results shown in FIG. 11 are stored in the memory of the processor element 1. When this process is repeated for the related data shown in the Table in FIG. 7 that is stored on the disk drive of the processor element 1, the results shown in FIG. 12 are stored in the memory of the processor element 1.

The same processing is performed by the processor element 2, the processor element 3 and the processor element 4, and the results obtained by queries 1 through 5 relative to the relation in FIGS. 8, 9 and 10 that are stored on the respective disk drives are represented as shown in FIGS. 13, 14 and 15, respectively.

When all the calculations have been performed, the final results for the aggregate queries 1 through 5 can be obtained. In this embodiment, a total calculation method is employed whereby a specified processor element calculates the total for a specific group in the aggregate queries 1 through 5. More specifically, the processor element 1 counts the total for groups of the months "Jan" and "Feb" in the query 1, groups of the weeks "Mon" and "Tue" in the query 2, a group of the location "Hokkaido" in the query 3, a group of the product number "1" in the query 4 and a group associated with the location "Hokkaido" in the set of the location and the week in the query 5. The processor element 2 counts the total for groups of the months "Mar" and "Apr" in the query 1, groups of the weeks "Wed" and "Thu" in the query 2, a group of the location "Kanto" in the query 3, a group of the product number "2" in the query 4 and a group associated with the location "Kanto" in the set of the location and the week in the query 5.

The processor element 3 counts the total for groups of the months "May" and "Jun" in the query 1, groups of the weeks "Fri" and "Sat" in the query 2, a group of the location "Kansai" in the query 3, a group of the product number "1" in the query 4 and a group associated with the location "Kansai" in the set of the location and the week in the query 5. The processor element 4 counts the total for groups of the months "Jul" and "Aug" in the query 1, a group of the week "Sun" in the query 2, a group of the location "Kyuushuu" in the query 3 and a group associated with the location "Kyuushuu" in the set of the location and the week in the query 5.

Therefore, the individual processor elements must transmit, to totaling nodes, data for groups held by the individual processor elements, except for data for groups that are counted by itself. The result counted by the processor element 1 is shown in FIG. 16; the result counted by the processor element 2 is shown in FIG. 17; the result counted by the processor element 3 is shown in FIG. 18; and the result counted by the processor element 4 is shown in FIG. 19.

2. BCm algorithm (FIG. 20)

This algorithm, which is based on the BC algorithm described in the background, is expanded for the parallel processing of a plurality of aggregations, so that hereinafter it is called the BCm algorithm. To execute a plurality of aggregations, the BCm algorithm also provides fast processing by reducing disk drive accesses to the minimum. In this case, a total of P aggregate queries are to be performed.

(1) First, space is acquired in a memory area for storing results that a processor element will obtain by the execution of Q aggregate queries (step 310). As well as the M explained for the 2Pm algorithm, the number Q of the queries is determined so that it falls within the range of the capacity of the memory area for each processor element. Since the access to the disk drive is shared when as many aggregate queries as possible are performed at one time, the processing speed is increased. The execution of Q aggregate queries may be performed differently by individual processor elements, or may be performed the same so that the resultant groups for the aggregations are sorted for processor elements.

Figure 21:
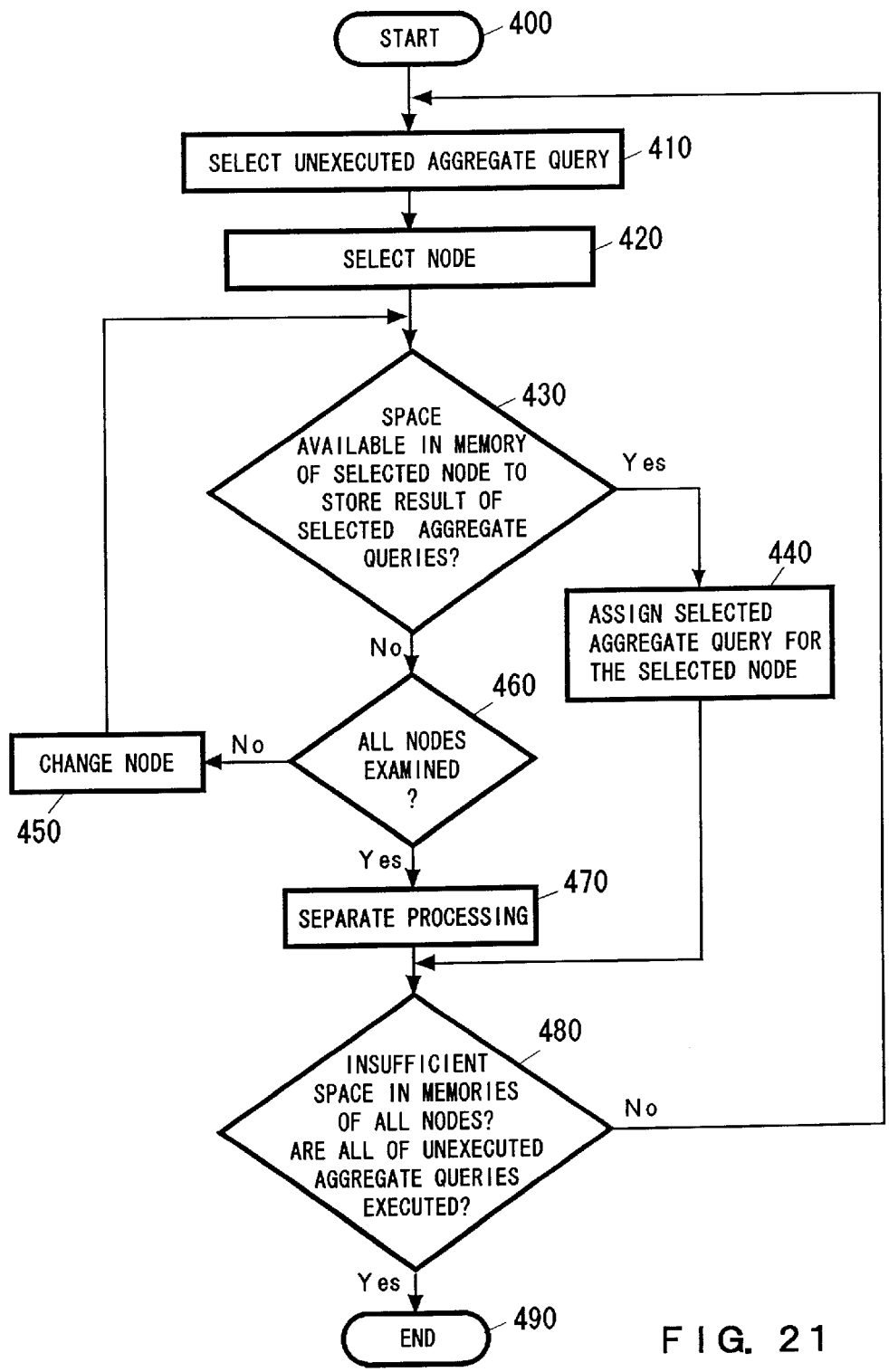
FIG. 21 is a flowchart for determining which processor element executes which aggregate query by using the BCm algorithm.

Example processing for assigning an aggregation for each processor element is shown in FIG. 21. First, an unexecuted aggregation is selected (step 410), and one of the processor elements is selected (step 420). Then, a check is performed to determine whether or not there is space available in the memory of the selected processor element to store the result of the selected aggregation (step 430). When space is available in the memory area of the processor element, the selected aggregation is assigned to the selected processor element (step 440). If no space is available in the memory of the selected processor element, the memory for another processor element is examined (step 450). When all of the processor elements are examined and no space is found for storing the results of the query (step 460), the aggregation is performed separately (step 470). "The separate processing" means the aggregation is performed at the subsequent processing since the process is repeated at step 350 in FIG. 20, or it is divided into several groups for execution.

In the above manner, the other aggregations are assigned to the processor elements. Since, when insufficient space is available in the memories of all the processor elements, the assignment process is performed again using the iterative process at step 350 in FIG. 20, and since, when the assignment process has been performed for all the unexecuted aggregation queries (step 480), the assigned aggregate queries are executed, the processing is suspended (step 490).

The above process for assigning the aggregate queries for the processor elements is only an example, and another method can be used to perform the assignment. It is possible for a user to intentionally assign a specific aggregate query to a specific processor element. As previously described, while the same aggregate query can be executed by the individual processor elements, a group of aggregation can be changed for an individual processor element. In this case, since the aggregation is the same type of operation but has a different group, it can be assigned to a processor element as a different aggregation using the process in FIG. 21. For this case, another assignment algorithm can be prepared.

More detailed pseudo code for the processing in FIG. 21 is shown below.

TABLE 4

```
// variables
N      : number of node
m_i    : memory size for each node ( 1 ≦ i ≦ N )
q      : query
q_i    : query ( 1 ≦ i ≦ Q )
QL     : list of queries to be aggregated
            # a list of aggregate queries to be executed
tmpQL  : list of queries    # for the subsequent processing
ML     : list of queries    # for the current processing
// initialization
```

TABLE 4-continued

```
QL = { q_1, q_2, . . . , q_i, . . . , q_Q }   # list of Q queries.
while QL ≠ NIL and tmpQL ≠ NIL do    # NIL : null list
   begin
for i=0 to N do
   begin
       m_j = getMaxMemSize( j ) ;
                           # Get memory size of each node.
   end
   tmpQL = NIL ;
   ML = NIL ;
while QL ≠ NIL do    # Execute until QL become null.
   begin
       q = pop( QL );
           # pop( ) means "acquire the head of the list."
       for j=1 to N do
          begin
          if ( m_j > |q| ) then    # Check whether space of the
                                  # memory for q can be acquired.
             begin          # |q| means memory size for query q.
             append( ML, q ) ;   # Add q to ML.
                m_j = m_j − |q| ;
                  # Subtract |q| from the residual memory size.
             break ;           # Exit for routine.
          end
       end
       if (there is no space for q) then
       begin
          append( tmpQL, q ) ;
                    # Add the query q to the unexecuted list.
       end
   end
   # Execute aggregate queries in ML.
   # Execute queries in tmpQL in the subsequent processing.
   while ML ≠ NIL do    # Execute until ML becomes NIL.
   begin
       q = pop( ML ) ;     # acquire a query at the head of ML.
       allocate ( q ) ;    # Allocate memory space for query q.
   end
   BCm( ) ;    # Execute BCm algorithm for queries in ML list.
   copy( QL, tmpQL ) ;    # Copy tmpQL to QL.
end
```

(2) Referring back to FIG. 20, from the individually owned part of the database, data to be currently processed are read and broadcast through a network (step 320). Because of the broadcast, the same data is transmitted to all the processor elements. It is not always necessary to determine which data is required for which processor element. According to the previously explained Rep algorithm and Repm algorithm described below, for which group each processor element performs aggregation is determined, and data is transmitted to a processor element that requires it. According to this algorithm, however, such a determination is not performed because not all the processor elements execute the same aggregation. If it is understood in advance that there is data that will not be employed by any processor element, transmission of that data can be eliminated.

(3) Q aggregate queries are executed for data read by an individual processor element and data received from another processor element, and results previously obtained by the aggregations (not present at first) (step 330).

(4) Processes (2) (step 320) and (3) (step 330) are repeated until execution of the Q aggregate queries is completed for all data in the database (step 340). If the sizes of the databases for the individual processor elements vary, although the processing of data in the owned part of the database has been completed, data may be transmitted from another processor element, or although data may not be transmitted from another processor element, the owned part of the database will not yet have been processed. In this case, at step 330, Q aggregate queries are executed for unprocessed data included in the individually owned part of the database or for data transmitted by the other processor elements and the results previously obtained by the aggregations.

(5) When Q aggregate queries have been executed for the data in all the databases, it is performed to check whether or not P aggregate queries have been executed (step 350). If not, the procedure at step 310 and the following steps are performed for another aggregate queries. If P aggregate queries have been executed, the processing is terminated (step 360).

According to the BCm algorithm, since only an individually owned disk drive is accessed, even though the processor element that executes specific aggregate queries performs an operation for all the data, the cost of accessing the disk drive is reduced. In addition, since accessing the disk drive is shared by a plurality of aggregate queries, the total cost is reduced.

The above processing will specifically be explained referring to FIGS. 7 to 10. Assume that the processor element 1 performs the query 1 previously mentioned, the processor element 2 performs queries 2 and 3, the processor element 3 performs the query 4, and the processor element 4 performs the query 5. The processing performed by the processor element 2 will now be described. In this explanation, one tuple of data is read, but a desired number of tuples of data can be read.

The processor element 2 reads the first tuple in FIG. 8 to the work space in the memory, and transmits that data to all the processor elements via the network. Since the other processor elements also read data (the first tuple in each database) and transmit them to all the rest of the processor elements, data in the first tuples in FIGS. 7 to 10 are stored in the work space in the memory of the processor element 2. The processor element 2 then executes the previously mentioned queries 2 and 3, which is a query (query 2) for adding the amount of sold each week and a query (query 3) for adding the amount of sold at each location.

When the processor element 2 begins the query 2 for the data present in the work space of the memory, the week "Sat" and the amount of sold "7," the week "Wed" and the amount of sold "15," and the week "Sun" and the amount of sold "3" are acquired. When the processor element 2 executes the query 3, the location "Kyuushuu" and the amount of sold "10,"the location "Kansai" and the amount of sold "6" and the location "Hokkaido" and the amount of sold "9" are acquired.

Following this, the processor element 2 reads the second tuple in FIG. 8 to the work space in the memory, and transmits that data to all the processor elements via the network. Since the other processor elements also read data (the second tuple in each database) and transmit them to all the rest of the processor elements, the data in the second tuples in FIGS. 7 to 10 are stored in the work space in the memory of the processor element 2.

When the processor element 2 begins the query 2 for the data present in the work space of the memory and the currently obtained result, the week "Sat" and the amount of sold "16," the week "Wed" and the amount of sold "15," the week "Sun" and the amount of sold "7," the week "Tue" and the amount of sold "8," and the week "Thu" and the amount of sold "1" are acquired. Similarly, when the processor element 2 executes the query 3, the location "Kyuushuu" and the amount of sold "11," the location "Kansai" and the amount of sold "6," the location "Hokkaido" and the amount of sold "21," and the location "Kanto" and the amount of sold "9" are acquired.

Then, the processor element 2 reads the third tuple in FIG. 8 to the work space in the memory, and transmits that data to the rest of the processor elements via the network. Since the other processor elements also read data (the third tuple in each database) and transmit them to all the rest of the processor elements, data in the third tuples in FIGS. 7 to 10 are stored in the work space in the memory of the processor element 2.

When the processor element 2 begins the query 2 for the data present in the work space of the memory and the currently obtained result, the week "Sat" and the amount of sold "16," the week "Wed" and the amount of sold "15," the week "Sun" and the amount of sold "15," the week "Tue" and the amount of sold "8," the week "Thu" and the amount of sold "9," and the week "Mon" and the amount of sold "4" are acquired. Similarly, when the processor element 2 executes the query 3, the location "Kyuushuu" and the amount of sold "11," the location "Kansai" and the amount of sold "6," the location "Hokkaido" and the amount of sold "31," and the location "Kanto" and the amount of sold "19" are acquired.

When the processor element 2 has executed the queries 2 and 3 for all the data in FIGS. 7 to 10 by repeating the above described process, data shown in FIG. 22 are stored in the memory of the processor element 2. The final results obtained by the processor elements 1, 3 and 4 are shown in FIG. 23.

Figure 24:
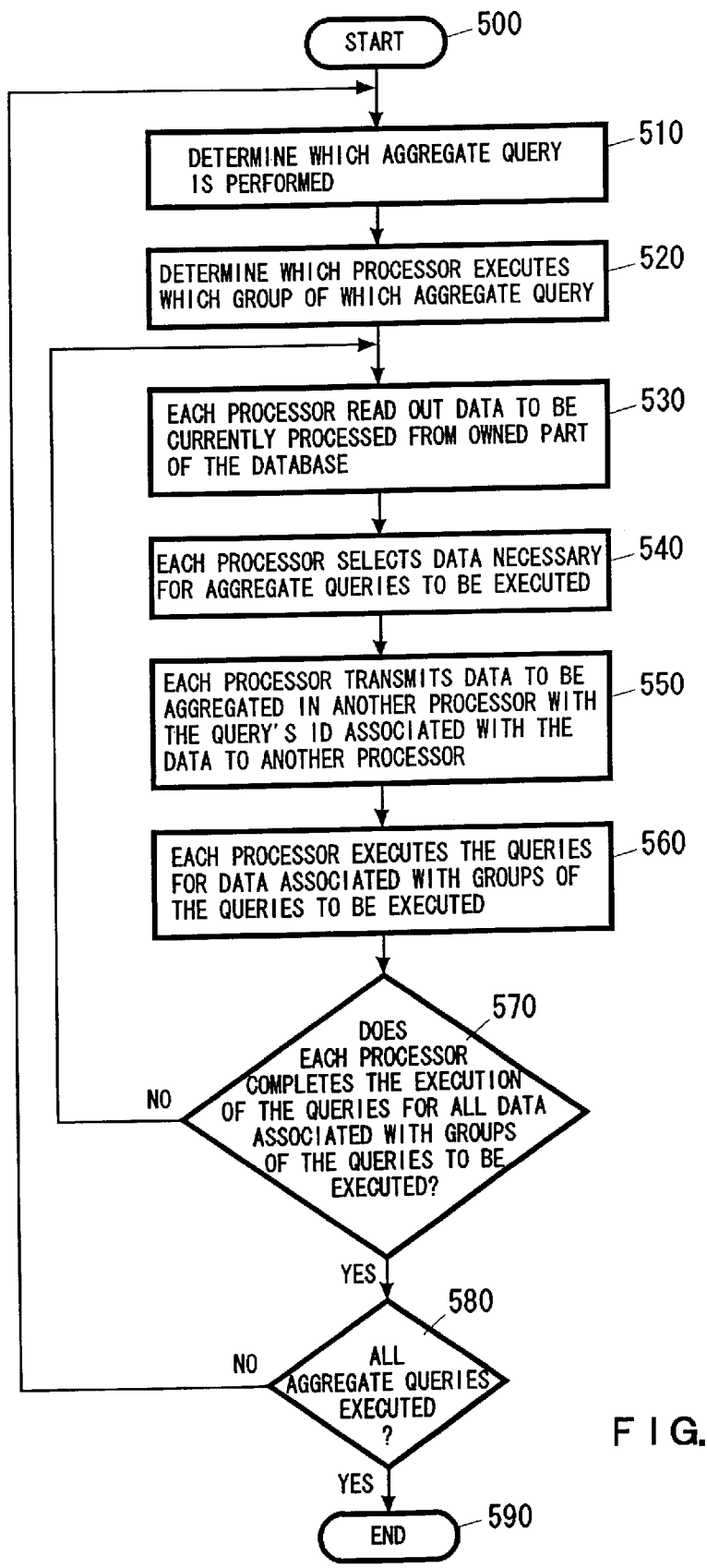
FIG. 24 is a processing flow of the Repm algorithm.

3. Repm algorithm (FIG. 24)

Because this algorithm is based on the Rep algorithm which is described in the background art and is expanded to perform a plurality of aggregate queries in parallel, it is called Repm algorithm. By minimizing the disk access when executing the plurality of aggregations, performance in the whole system is enhanced. In this case, S aggregate queries are executed.

(1) First, it is determined which queries are executed in the S aggregate queries (step 510). At this time, T aggregate queries are executed. In the following explanation, each processor element executes the same queries, but executes difference groups in the same queries. However, it is not necessary that each processor element executes the same queries. In addition, this step has to be performed referring to available memory capacity in the whole system. However, it is not necessary to refer to only the available memory capacity. It is possible that a user specifies the queries within the available memory capacity. One example for implementing this step is shown in the following pseudo code.

TABLE 5

```
Input:     number of aggregate queries: s
           estimated size of the result of each aggregate query
                       : n(1), n(2), . . . n(s)
           size of the main memory in the whole system: M
output:    Output is aggregate queries which can be put in the memory.
algorithm:
R = { 1, 2, . . . s };
           # a group of unprocessed aggregate queries
while R is not empty do
    m = M;        # size of the residual memory space
    Q = empty;    # Initialization of Q which stores the result
    while m >= 0 or R is empty do
        x = an element in R; # Acquire an element in R
        R = R - { x };       # Take away the element from R.
        Q = Q + { x };       # Add the element to Q
        m = m - n(x);        # Subtract memory size of the execution
                             # result of the element from m.
    done;
    output (Q);
        # Output Q as a group of the aggregate queries which
        # can be put in the memory.
done.
```

(2) In the next step, it is determined which processor element executes aggregations for which group of the aggregate queries. For example, if there are b, c, d and e groups associated with query A, the b, c, d and e are respectively assigned to processor elements 1, 2, 3 and 4. If there are f, g, h and i associated with query B, the f, g, h and i are respectively assigned to processor elements 1, 2, 3 and 4. This step can not be executed without knowledge about what groups exist in each aggregate queries. However, if execution is performed for sampling in a small way, the kinds of the groups can be grasped. In addition, there are a lot of variations of the method for assigning the groups. For example, it is possible that a hash function whose input is a group is prepared to assign a processor element according to the range of the hash value. It is also possible that a user assigns one processor element to one group, specifically.

The whole system should perform the above steps 510 and 520. Therefore, it is possible to assign this process to one specific processor element or to provide one control processor and to cause the control processor to execute the process.

(3) Then, each processor element reads out data to be processed from the owned part of the database (step 530). For example, one tuple is read out or a plurality of tuples in the database are read out.

(4) Each processor element selects necessary data for execution of the aggregate queries in the read data (step 540). For example, if one tuple in the database is read out, data about unnecessary attributes for the aggregate queries are read out. Therefore, the data about the unnecessary attributes are discarded in the whole system. In this case, data about unnecessary attribute for the T aggregate queries which are determined in the step 510 is discarded. Since, in the Rep algorithm described in the background art, the read data is used for only one aggregate query is used, one disk access is used in the Repm algorithm T times as efficiently as in the Rep algorithm.

(5) In the next step, each processor element transmits data to be aggregated in another processor element in the read data to another processor element with the aggregate query's ID, which is associated with the data to be aggregated in another processor element, via the network 1 (step 550). Since a necessary attribute in the data is determined by the executed aggregate query and a value of the attribute determines its group, a hash function for determining a destination processor element by using the attribute value as an input is prepared. This step is performed for each of the T aggregate queries. At this time, the ID of the aggregate query is attached to transmitted data so that the receiving processor element can judge for which aggregate query the data is transmitted.

(6) Each processor element executes the T aggregate queries for data associated with groups of the aggregate queries to be executed in the processor element (step 560). This step is executed for the results of the aggregations previously obtained and necessary data in the processor element of the read data and data transmitted from another processor elements.

(7) Then, until each processor element executes the T aggregate queries for all the data associated with groups of the aggregate queries to be executed (step 570). That is, it is repeated until the read data and received data become necessary part of the whole database.

(8) If this execution completes, the processing for the T aggregate queries completes. Therefore, next T aggregate queries (the number T may be different from current T.) will be executed by repeating the step 510 and the subsequent steps until the S aggregate queries are executed (step 580).

Execution example is described using FIG. 7 to 10. At this time, simultaneously executed aggregate queries are the query 1 (a query for totaling an amount of sold by month) and the query 2 (a query for totaling an amount of sold by day of the week). The number of the processor element is 4. The processor element 1 aggregates Jan and Feb groups of the query 1 and Mon and Tue groups of the query 2. The processor element 2 aggregates Mar and Apr groups of the query 1 and Wed and Thu groups of the query 2. The processor element 3 aggregates May and Jun groups of the query 1 and Fri and Sat groups of the query 2. The processor element 4 aggregates Jul and Aug groups of the query 1 and Sun group of the query 2.

The example processing of the processor element 3 is explained below. FIG. 25 shows the state where the processor element 3 read out the first tuple in the database for the processor element 3, which is shown in FIG. 9. In this example, one tuple is read out one time, but the number of the read tuple is arbitrary. In this example, the columns of "day" and "location" and "shop#" and "product#" are discarded because those columns are not necessary for the query 1 and 2 (See step 540). The columns of "month" and "week" and "sold" are necessary for the query 1 and 2. Then, month "Aug" and amount of sold "7" are transmitted to the responsible processor element 4 with the ID of the query 1 (See step 550). Because day of the week "Sat" and amount of sold "7" is for a group to be aggregated in the processor element 3, the processor element 3 aggregates the data. Here, the data is first data, therefore the data is merely recorded. If the processor element 1 and 2 and 4 read out and process the first tuple in those database, no data is transmitted to the processor element 3.

The state where the processor element 3 read out the second tuple in FIG. 9 is shown in FIG. 26. Unnecessary part in the tuple is already discarded. Month "Apr" and amount of sold "8" are transmitted to the processor element 2 with the ID of the query 1. In addition, day of the week "Tue" and amount of sold "8" are transmitted to the processor element 1 with the ID of the query 2. If the processor element 1 and 2 and 4 simultaneously read out and process the second tuple in the individual database, day the week "Sat" and amount of sold "9" are received from the processor element 4 with the ID of the query 2. Then, the processor element 3 obtains day of the week "Sat" and amount of sold "16" referring to the result of the first tuple.

The state where the processor element 3 read out the third tuple in FIG. 9 is shown in FIG. 27. Unnecessary part in the tuple is already discarded. Month "May" and amount of sold "8" are data to be aggregated by the processor element 3. Here, the processor element 3 records the Month "May" and amount of sold "8". Day of the week "Thu" and amount of sold "8" are transmitted to the processor element 2 with the ID of the query 2. If the processor element 1 and 2 and 4 simultaneously read out and process the third tuple in the individual database, the processor element 3 receives month "Jun" and amount of sold "2" with the ID of the query 1 from the processor element 1 and month "May" and amount of sold "2" with the ID of the query 1 from the processor element 2. The processor element 3 refers to the previously obtained results and obtains and stores the result of month "May" and amount of sold "10" and month "Jun" and amount of sold "2". This explanation shows data read by the processor element and data transmitted from another processor element are differently processed. However, this is only for convenience of the explanation, and both data can be processed without any discrimination.

The state where the processor element 3 read out the forth tuple in FIG. 9 is shown in FIG. 28. Because month "Mar" and amount of sold "8" are for a group to be aggregated in the processor element 2, the processor element 3 transmits the data to the processor element 2 with the ID of the query 1. In addition, because day of the week "Fri" and amount of sold "8" are for a group to be aggregated in the processor element 3, the data is only stored in this case. If the processor element 1 and 2 and 4 simultaneously read out and process the forth tuple in the individual database, month "May" and amount of sold "4" are received from the processor element 1 with the ID of the query 1, and day of the week "Fri" and amount of sold "4" are received from the processor element 1 with the ID of the query 2, and day of the week "Fri" and amount of sold "9" are received from the processor element 2 with the ID of the query 2, and month "Jun" and amount of sold "3" are received from the processor element 4 with the ID of the query 1, and day of the week "Sat" and amount of sold "3" are received from the processor element 4 with the ID of the query 2. Therefore, the processor element 3 obtains from those data month "May" and amount of sold "14" and month "Jun" and amount of sold "5" and day of the week "Fri" and amount of sold "21" and day of the week "Sat" and amount of sold "19".

By repeating these processing, the processor element 3 obtains part of the query 1 and query 2 in FIG. 18. Similarly, the processor element 1 obtains part of the query 1 and query 2 in FIG. 16. The processor element 2 obtains part of the query 1 and query 2 in FIG. 17. the processor element 4 obtains part of the query 1 and query 2 in FIG. 19. FIG. 29 shows the destination processor element (node) of the data when each processor element transmits to another processor element (node) with the ID of the query 1. Inversely, for the query 1, FIG. 30 shows the source processor element (node) of the data transmitted to each processor element from another processor element. In addition, FIG. 31 shows the destination processor element (node) of the data when each processor element transmits to another processor element (node) with the ID of the query 2. Inversely, for the query 2, FIG. 32 shows the source processor element (node) of the data transmitted to each processor element from another processor element.

The recapitulations below are for the algorithms that have been explained. Since according to the 2Pm algorithm the processor elements respectively execute aggregations for data stored on their disk drives, the processor elements must prepare a memory having the same size as the final results obtained by the aggregations. However, as the communication cost is low, the processing speed is faster than the other algorithms when the final results are small.

According to the BCm algorithm, since all of the processor elements can individually store the final results in their memories, access to a disk drive can be shared by a number of aggregate queries that is multiple times, the equivalent of the number of processors, of the number of aggregate queries that can be processed at one time by using the 2Pm algorithm. When the final result is too large to be stored in the memory in one processor element, the repetitive 2Pm algorithm process is required for the final result; however, by using the BCm algorithm, the final result can be stored in the memory and the performance of the BCm algorithm is required only once. In this case, the processing speed using the BCm algorithm is higher than that using the 2Pm algorithm.

If the memory size for storing the final result is very large, Repm algorithm may be advantageous because cost of the access to the disk device and totaling cost become large in algorithms other than the Repm algorithm.

Since the optimal algorithm is not always the same, it is preferable that an optimal algorithm be selected from among the Repm algorithm, the 2Pm algorithm and the BCm algorithm, and that a plurality of aggregate queries be executed by using the selected algorithm. Costs required for the execution of each algorithm are to be estimated. An explanation will now be given for a cost model.

First, costs that will occur are shown in Table 6.

TABLE 6

| Symbols | Contents | Values |
|---------|----------|--------|
| N | No. of nodes | variable |
| R | Size of relation (Byte) | 5 G |
| $|R|$ | No. of tuples in R | 10 million |
| $|R_i|$ | No. of tuples on node i | $|R|/N$ |
| $|R_p|$ | No. of repartitioned tuples | $\max(|R_i|, 1/S/Q)$ |
| Q | No. of aggregate queries | variable |
| T | No. of scans of the source data | variable |
| A | No. of aggregate function per query | 100 |
| S | Grouping selectivity of a query | variable |
| $S_1$ | Phase 1 selectivity (for 2P) | $\min(SN, 1)$ |
| $S_g$ | Phase 2 selectivity (for 2P) | $\min(1/N, S)$ |
| $|G|$ | No. of result tuples | $|R|S$ |
| p | Projectivity | 0.5 |
| $|G_i|$ | No. of result tuples on node i | $|R_i|S_1$ |
| P | Page size | 4 KB |
| M | Size of hash table | 50 MB |
| mips | CPU speed | 120 MIPS |
| IO | Time to read a page | 0.8 ms |
| $t_r$ | Time to read a tuple | 200/mips |
| $t_w$ | Time to write a tuple | 200/mips |
| $t_h$ | Time to compute hash | 200/mips |
| $t_a$ | Time to compute an aggregate | 40/mips |
| $t_m$ | Time to send a page | 0.1 ms |
| $t_b$ | Time to broadcast a page | $(N-1)t_m$ |

Specific values in the right column are merely examples, and other values will be employed in another computer system. Symbols sandwiched between vertical lines indicate the values for those symbols, and symbols without vertical lines indicate the number of bytes used for those symbols.

An explanation will be now given for several symbols. Page size P is the size of data handled by a computer system. Projectivity p indicates a rate of columns in the relation that are employed. Selectivity of one aggregate query indicates a value obtained by dividing the number of groups by the number of data sets. In addition, there are cases where aggregate queries which use the same attribute differently process the attribute, such as counting the occurrence and totaling the value, and where, for example, a value which satisfies a predetermined condition is aggregated. Therefore, A is defined as the number of the different processes of the attribute. In the Data Mining, A becomes a large value, such as 100 in the Table 6.

Using the above background, the costs of the individual algorithms will be described.

1. 2Pm algorithm (a) cost for reading from a database $(R_i/P)*IO*T$ (b) cost for selecting necessary data $|R_i|*t_r*T$ (c) cost for executing aggregate queries
$|R_i|*(t_h+t_a*A)*Q$ (d) cost for data that can not be processed by the first hashing
$(R_i*p*Q-M/S_f*T)/P*2*IO$ (e) cost for generating tuples to store results
$|G_i|*t_w*Q$ (f) transmission/reception cost
$G_j/P*t_m*Q$ (g) cost for calculating final results
$|_i|*(t_r+t_a*A)*Q$ (h) cost for generating tuples to store results (for the second phase)
$|G_i|*S_g*t_w*Q$ (i) cost for data that can not be processed by the first hashing (for the second phase)
$(G_i*Q-M/S_g*T)/P*2*IO$ (j) cost for storing results on a disk drive
$G_i*S_g/P*IO*Q$ Total of these costs is of the 2Pm algorithm.

2. BCm algorithm (a) cost for reading data from database
$(R_i/P)*IO*T$ (b) cost for broadcasting data
$(R_i/P)*t_b*T$ (c) cost of getting tuples from the communication buffer
$|R|*t_r*T$ (d) Aggregation cost
$|R_p|*(t_b+t_a*A)*Q$ (e) cost for data that can not be processed by the first hashing
$(R_p*p*Q-M/S*T)/P*2*IO$ (f) cost for generating tuples to store results
$|R_p|*S*tw*Q$ (g) cost for storing results on a disk drive
$R_p*S/P*p*IO*Q$ The sum of these costs is the cost for the BCm algorithm.

3. Repm algorithm (a) cost for reading data from a database
$(R_i/P)*IO*T$ (b) cost for selecting necessary data
$|R_i|*t_r*T$ (c) cost of hashing to find the destination and writing to communication buffer
$R_i*(t_h+t_w)*Q$ (d) cost for sending and receiving repartitioned data
$|R_p|/P*p*t_m*Q$ (e) cost for aggregation
$|R_p|*(t_r+t_a*A)*Q$ (f) cost for data that can not be processed by the first hashing
$(R_p*p*Q-M/S*T)/P*2*IO$ (g) cost for generating result tuples
$|R_p|*S*t_w*Q$ (h) cost for storing results on a disk drive
$R_p*S/P*p*IO*Q$ The sum of these costs is for the Repm algorithm.

In this manner, the costs required for the individual algorithms can be acquired. An algorithm to be executed is determined by the following process (FIG. 33) in accordance with the acquired costs. First, parameters concerning hardware are input (step 610). The parameters concerning the hardware are determined by the hardware configuration, such as the number of processor elements, the size of a hash table, the time required for reading a page, the time required for reading a tuple, the time required for writing a tuple, the time required for hash calculation, the time required for page transmission, the time required for aggregation operation and the time required for broadcasting a page in the Table 6. Most of the parameters are not changed once the configuration of a computer is determined, but it is possible by calculation to change the number of the processor elements and the size of the hash table. The parameters concerning aggregate queries to be executed are input (step 620). In Table 6, almost all the parameters other than those for hardware are related to the aggregations. While the number of resultant tuples is not determined by only the aggregations, that value can be obtained by performing data sampling and estimating the number of groups. This process has been performed (see, for example, "Sampling-based Estimation Of The Number Of Distinct Values Of An Attribute," P. J. Haas, J. F. Naughton, S. Seshadri and L. Stockes, in Proceedings of the 21st VLDB Conference, pp. 311–322, 1995).

When parameters shown in Table 6 are input, the costs of the individual algorithms can be calculated in accordance with the previously described cost models (step 630). Then, the algorithm requiring the lowest cost of the three is determined (step 640). The aggregations can be performed at the highest speed by using the selected algorithm.

An explanation has been given for the computer system and the processing flow of the program that are required for implementing the present invention. It is possible to form a circuit for each step of the processing flow of the program processing or means for performing the individual steps by using a combination of a program and a circuit. The means for performing the individual steps are provided instead of the processor elements, and perform parallel processing across a high speed network. It is also possible to provide a controller for controlling the repetitive process and to provide management means for controlling the entire system.

The program for performing the above described processing can be distributed by using a storage medium, such as a floppy disk, a CD-ROM or an MO (Magneto-Optics) disk. In addition, the program can be distributed not only on a storage medium, but also by a wire or radio communication medium. In this case, for several steps in the above described processing, the program can be provided for a user, separately from a program run by using a storage medium or a communication medium.

FIG. 34 is a graph showing an optimal algorithm for each condition when an IBM SP2, which has a 16-node high performance switch, is employed. In this system, the 2Pm algorithm is optimal in region a, the BCm algorithm is optimal in region b, and the Rep algorithm is optimal in region c. The optimal algorithm can be selected in accordance with the number of queries and the number of groups for each query. It should be noted that instead of preparing the graph to select the optimal algorithm, the costs for the algorithms can be calculated by using the above cost model and can be compared with each other to select the optimal algorithm.

As described above, a method for performing a plurality of aggregations in parallel and at a high speed can be provided.

Since a plurality of aggregations can be performed in parallel and at a high speed by using the above described method, the speed for the execution of OLAP and Data Mining can be increased.

In addition, since a method for executing a plurality of aggregations can be switched to another based on hardware conditions and the properties of a plurality of aggregations, under various conditions a plurality of aggregations can be executed at a higher speed than normal by using the same method.

What is claimed is:

1. A method for executing N aggregate queries for a database in a computer system, wherein said computer system is so constructed that each of a plurality of processors connected by a network can use a memory area for itself and a part of said database for itself, said database including data which is categorized into a plurality of groups, said aggregate query including a query of an aggregation for each of said groups, said method comprising the steps of:

(a) ensuring space for storing results of M aggregate queries of said N aggregate queries (M being an integer less than N) in the memory area for itself in each said processor;

(b) executing said M aggregate queries together for said part of said database for itself in each said processor in parallel;

(c) transmitting the results of said M aggregate queries executed by each said processor to a processor for counting up and calculating a final result; and (d) iterating said steps (a) to (c) until execution of said N aggregate queries is completed.

2. The method according to claim 1, wherein said step (b) includes the steps of:

(b1) in each said processor, reading a part of a partial database into a work space of said memory area for itself, said partial database being said part of said database for itself;

(b2) in each said processor, executing said M aggregate queries for results of calculations that were performed at previous steps and stored in the memory area for itself and the read part of said partial database; and (b3) iterating said steps (b1) and (b2) until execution of said M aggregate queries is completed for all of said database.

3. The method according to claim 1, wherein M is determined from an amount of space which can be acquired in said memory area for itself for storage of results obtained by execution of aggregate queries.

4. A method for executing P aggregate queries for a database in a computer system, wherein said computer system is so constructed that each of a plurality of processors connected by a network can use a memory area for itself and a partial database which is a part of said database for itself, said database including data which is categorized into a plurality of groups, said aggregate query including a query of an aggregation for each of said groups, said method comprising the steps of:

(a) in each said processor, ensuring space for storing results of Q aggregate queries (Q being an integer less than P) to be executed in that processor of said P aggregate queries in the memory area for itself;

(b) executing said Q aggregate queries for data in the entire database in each said processor by iterating a step of reading a part of said partial database into the memory area for itself in each said processor and a step of broadcasting said read part of said partial database via said network in each said processor; and (c) iterating said steps (a) and (b) until execution of said P aggregate queries is completed.

5. The method according to claim 4, wherein said step (a) includes the steps of:

(a1) checking whether space in which a result of an execution of one aggregate query is stored is present in the memory area for one processor;

(a2) acquiring said space for said result of said execution of said one aggregate query when said space is present;

(a3) when said space is not present, checking whether said space in which said result of said execution of said one aggregate query is stored is present in the memory area for another processor; and (a4) acquiring said space for said result of said execution of said one aggregate query when said space is present in said another processor; and wherein, when said space is not present in the memory area for said another processor, said one aggregate query is executed in a succeeding iteration process.

6. The method according to claim 4, wherein Q is determined from an amount of space which can be acquired in said memory area for itself for storage for results obtained by execution of aggregate queries.

7. The method according to claim 4, wherein said step (b) includes the steps of:

(b1) in each said processor, reading a part of said partial database to a work space of said memory area for itself;

(b2) broadcasting the read part of said partial database via said network;

(b3) executing said Q aggregate queries for results of calculations that were performed at previous steps and stored in the memory area for itself and the read part of said partial database and data transmitted from other processors; and (b4) iterating said steps (b1) to (b3) until each said processor completes execution of said Q aggregate queries for all data in said database.

8. A method for executing S aggregate queries for a database in a computer system, wherein said computer system is so constructed that each of a plurality of processors connected by a network can use a memory area for itself and a partial database which is a part of a database for itself, said database including data which is categorized into a plurality of groups, said aggregate query including a query of an aggregation for each of the groups, said method comprising the steps of:

(a) determining T aggregate queries to be executed of said S aggregate queries;

(b) determining which processor aggregates each group of each of said T aggregate queries, wherein each said group is to be aggregated when said T aggregate queries are executed;

(c) in each said processor, reading out a part of said partial database into said memory area for itself, and transmitting data associated with a group to be aggregated in another processor of an aggregate query in the read data to said another processor via said network with the aggregate query's ID, and executing said aggregate queries for data associated with groups to be aggregated in that processor of said T aggregate queries;

(d) iterating said step (c) until each said processor completes the execution of said T aggregate queries for all data associated with groups to be aggregated in that processor of said T aggregate queries; and (e) iterating said steps (a) to (d) until the execution of said S aggregate queries is completed.

9. The method according to the claim 8, wherein the step (c) includes the steps of:

(c1) in each said processor, reading a part of said partial database into a work area in the memory area for itself;

(c2) in each said processor, determining which processor needs each portion of read data, transmitting said portion with an ID of an aggregate query associated with said portion to the needing processor via said network; and (c3) in each said processor, executing said T aggregate queries for data associated with groups to be aggregated in that processor in the read data and data transmitted from other processors and results of calculations which were performed at the previous steps and stored in the memory area for itself.

10. A method for executing N aggregate queries for a database in a computer system, wherein said computer system is so constructed that each of a plurality of processors connected by a network can use a memory area for itself and a partial database which is a part of said database for itself, said database including data that is categorized into a plurality of groups, said aggregate query including a query of an aggregation for each of said groups, said method comprising the steps of:

determining which method in a plurality of aggregate query execution methods which includes first and second and third methods is the speediest by using parameters of said computer system that includes the number of said processors, the size of said database and a communication speed of said network, and parameters associated with properties of said aggregate queries that include the number of aggregate queries to be executed and a capacity of memory in which the results of said execution of said aggregate queries are stored, wherein said first method comprises the steps of:
(a) ensuring space for storing results of M aggregate queries of said N aggregate queries (M is an integer equal to or less than N) in the memory area for itself in each processor;
(b) executing said M aggregate queries together for said part of database for itself in each said processor;
(c) transmitting the results of said M aggregate queries executed by each processor to a processor for counting up in each said processor, and calculating a final result in said processor for counting up; and
(d) iterating said steps (a) to (c) until execution of said N aggregate queries is completed, wherein said second method comprises the steps of:
(e) in each said processor, ensuring space for storing results of Q aggregate queries to be executed in that processor of said N aggregate queries in the memory area for itself;
(f) executing said Q aggregate queries for data in the entire database in each said processor by iterating a step of reading a part of said partial database into the memory area for itself in each said processor and a step of broadcasting said read part of said partial database via said network in each said processor; and
(g) iterating said steps (e) and (f) until execution of said N aggregate queries is completed, wherein said third method comprising the steps of:
(h) determining T aggregate queries to be executed of said N aggregate queries;
(i) determining which processor aggregates each group of each of said T aggregate queries, wherein each said group is to be aggregated when said T aggregate queries are executed;
(j) in each said processor, reading out a part of said partial database into said memory area for itself, and transmitting data associated with a group to be aggregated in another processor of an aggregate query in the read data to said another processor via said network with the aggregate query's ID, and executing said aggregate queries for data associated with groups to be aggregated in that processor of said T aggregate queries;
(k) iterating said step (j) until each said processor completes the execution of said T aggregate queries for all data associated with groups to be aggregated in that processor of said T aggregate queries; and
(l) iterating said steps (h) to (k) until the execution of said N aggregate queries is completed; and executing said N aggregate queries by the determined method.

11. A computer system for executing N aggregate queries for a database, said computer system being so constructed that each of a plurality of processors connected by a network can use a memory area for itself and a part of said database for itself, said database including data that is categorized into a plurality of groups, said aggregate query including a query of an aggregation for each of said groups, each said processor comprising:

(a) a memory processor for ensuring space for storing results of M aggregate queries of said N aggregate queries (M being an integer less than N) in the memory area for itself;
(b) a database processor for executing said M aggregate queries together for said part of said database for itself;
(c) a transmitter for transmitting results obtained by said M aggregate queries to a processor for counting up; and wherein each said processor operates said memory processor and said database processor and said transmitter until the execution of the N aggregate queries is completed, and said processor for counting up receives and counts up execution results to be counted up in that processor from other processors.

12. A computer system for executing N aggregate queries for a database, said computer system being so constructed that each of a plurality of processors connected by a network can use a memory area for itself and a partial database which is a part of said database for itself, said database including data that is categorized into a plurality of groups, said aggregate query including a query of an aggregation for each of said groups, each said processor comprising:

(a) a memory processor for ensuring space for storing results of Q aggregate queries (Q being an integer less than N) to be executed in that processor of said N aggregate queries in the memory area for itself;
(b) a database processor for executing said Q aggregate queries for data in the entire database by iterating a step of reading a part of said partial database into a work space in the memory area for itself and a step of broadcasting via said network the read part of said partial database; and wherein each said processor operates said memory processor and said database processor until execution of said P aggregate queries is completed.

13. A computer system for executing S aggregate queries for a database, said computer system being so constructed that each of a plurality of processors connected by a network can use a memory area for itself and a partial database which is a part of said database for itself, said database including data that is categorized into a plurality of groups, said aggregate query including a query of an aggregation for each of said groups, said computer system comprising:

a controller for determining T aggregate queries to be executed of said S aggregate queries and determining which processor aggregates each group of each of said T aggregate queries, wherein each said group is to be aggregated when said T aggregate queries are executed, each said processor comprising:
- a database processor for reading out a part of said partial database into said memory area for itself, and transmitting data associated with a group to be aggregated in another processor of an aggregate query in the read data to said another processor via said network with the aggregate query's ID, and executing said aggregate queries for data associated with groups to be aggregated in that processor of said T aggregate queries,
- wherein said database processor operates until each said processor completes the execution of said T aggregate queries for all data associated with groups to be aggregated in that processor of said T aggregate queries, and said controller and each said processor operate until the execution of said S aggregate queries is completed.

14. A computer system for executing N aggregate queries for a database, said computer system being so constructed that each of a plurality of processors connected by a network can use a memory area for itself and a partial database which is a part of said database for itself, said database including data that is categorized into a plurality of groups, said aggregate query including a query of an aggregation for each of said groups, said computer system comprising:
- a selector for determining which method in a plurality of aggregate query execution methods which includes first and second and third methods is the speediest by using parameters of said computer system that includes the number of said processors, the size of said database and a communication speed of said network, and parameters associated with properties of said aggregate queries that include the number of aggregate queries to be executed and a capacity of memory in which the results of said execution of said aggregate queries are stored,
- wherein said first method comprises the steps of:
  - (a) ensuring space for storing results of M aggregate queries of said N aggregate queries (M is an integer equal to or less than N) in the memory area for itself in each processor;
  - (b) executing said M aggregate queries together for said part of database for itself in each said processor;
  - (c) transmitting the results of said M aggregate queries executed by each processor to a processor for counting up in each said processor, and calculating a final result in said processor for counting up; and
  - (d) iterating said steps (a) to (c) until execution of said N aggregate queries is completed,
- wherein said second method comprises the steps of:
  - (e) in each said processor, ensuring space for storing results of Q aggregate queries to be executed in that processor of said N aggregate queries in the memory area for itself;
  - (f) executing said Q aggregate queries for data in the entire database in each said processor by iterating a step of reading a part of said partial database into the memory area for itself in each said processor and a step of broadcasting said read part of said partial database via said network in each said processor; and
  - (g) iterating said steps (e) and (f) until execution of said N aggregate queries is completed,
- wherein said third method comprising the steps of:
  - (h) determining T aggregate queries to be executed of said N aggregate queries;
  - (i) determining which processor aggregates each group of each of said T aggregate queries, wherein each said group is to be aggregated when said T aggregate queries are executed;
  - (j) in each said processor, reading out a part of said partial database into said memory area for itself, and transmitting data associated with a group to be aggregated in another processor of an aggregate query in the read data to said another processor via said network with the aggregate query's ID, and executing said aggregate queries for data associated with groups to be aggregated in that processor of said T aggregate queries;
  - (k) iterating said step (j) until each said processor completes the execution of said T aggregate queries for all data associated with groups to be aggregated in that processor of said T aggregate queries; and
  - (l) iterating said steps (h) to (k) until the execution of said N aggregate queries is completed; and
- means for instructing each said processor to execute said N aggregate queries by the determined method.

15. A storage medium for storing a program for causing a computer system to execute N aggregate queries for a database, wherein said computer system is so constructed that each of a plurality of processors connected by a network can use a memory area for itself and a part of said database for itself, said database including data which is categorized into a plurality of groups, said aggregate query including a query of an aggregation for each of said groups, said program comprising the steps of:
- (a) ensuring space for storing results of M aggregate queries of said N aggregate queries (M being an integer less than N) in the memory area for itself in each processor;
- (b) executing said M aggregate queries together for said part of database for itself in each said processor;
- (c) transmitting the results of said M aggregate queries executed by each processor to a processor for counting up in each said processor, and calculating a final result in said processor for counting up; and
- (d) iterating said steps (a) to (c) until execution of said N aggregate queries is completed.

16. A storage medium for storing a program for causing a computer system to execute P aggregate queries for a database, wherein said computer system is so constructed that each of a plurality of processors connected by a network can use a memory area for itself and a partial database which is a part of said database for itself, said database including data which is categorized into a plurality of groups, said aggregate query including a query of an aggregation for each of said groups, said program comprising the steps of:
- (a) in each said processor, ensuring space for storing results of Q aggregate queries (Q being an integer less than P) to be executed in that processor of said P aggregate queries in the memory area for itself;
- (b) executing said Q aggregate queries for data in the entire database in each said processor by iterating a step of reading a part of said partial database into the memory area for itself in each said processor and a step of broadcasting said read part of said partial database via said network in each said processor; and
- (c) iterating said steps (a) and (b) until execution of said P aggregate queries is completed.

17. A storage medium for storing a program for causing a computer system to execute S aggregate queries for a database, wherein said computer system is so constructed that each of a plurality of processors connected by a network can use a memory area for itself and a partial database which is a part of said database for itself, said database including data which is categorized into a plurality of groups, said aggregate query including a query of an aggregation for each of said groups, said program comprising the steps of:

(a) determining T aggregate queries to be executed of said S aggregate queries;

(b) determining which processor aggregates each group of each of said T aggregate queries, wherein each said group is to be aggregated when said T aggregate queries are executed;

(c) in each said processor, reading out a part of said partial database into said memory area for itself, and transmitting data associated with a group to be aggregated in another processor of an aggregate query in the read data to said another processor via said network with the aggregate query's ID, and executing said aggregate queries for data associated with groups to be aggregated in that processor of said T aggregate queries;

(d) iterating said step (c) until each said processor completes the execution of said T aggregate queries for all data associated with groups to be aggregated in that processor of said T aggregate queries; and (e) iterating said steps (a) to (d) until the execution of said S aggregate queries is completed.

18. A storage medium for storing a program for causing a computer system to execute N aggregate queries for a database, wherein said computer system is so constructed that each of a plurality of processors connected by a network can use a memory area for itself and a partial database which is a part of said database for itself, said database including data which is categorized into a plurality of groups, said aggregate query including a query of an aggregation for each of said groups, said program comprising the steps of:

determining which method in a plurality of aggregate query execution methods which includes first and second and third methods is the speediest by using parameters of said computer system that includes the number of said processors, the size of said database and a communication speed of said network, and parameters associated with properties of said aggregate queries that include the number of aggregate queries to be executed and a capacity of memory in which the results of said execution of said aggregate queries are stored, wherein said first method comprises the steps of:
(a) ensuring space for storing results of M aggregate queries of said N aggregate queries (M is an integer equal to or less than N) in the memory area for itself in each processor;

(b) executing said M aggregate queries together for said part of database for itself in each said processor;

(c) transmitting the results of said M aggregate queries executed by each processor to a processor for counting up in each said processor, and calculating a final result in said processor for counting up; and (d) iterating said steps (a) to (c) until execution of said N aggregate queries is completed, wherein said second method comprises the steps of:
(e) in each said processor, ensuring space for storing results of Q aggregate queries to be executed in that processor of said N aggregate queries in the memory area for itself;

(f) executing said Q aggregate queries for data in the entire database in each said processor by iterating a step of reading a part of said partial database into the memory area for itself in each said processor and a step of broadcasting said read part of said partial database via said network in each said processor; and (g) iterating said steps (e) and (f) until execution of said N aggregate queries is completed, wherein said third method comprising the steps of:
(h) determining T aggregate queries to be executed of said N aggregate queries;

(i) determining which processor aggregates each group of each of said T aggregate queries, wherein each said group is to be aggregated when said T aggregate queries are executed;

(j) in each said processor, reading out a part of said partial database into said memory area for itself, and transmitting data associated with a group to be aggregated in another processor of an aggregate query in the read data to said another processor via said network with the aggregate query's ID, and executing said aggregate queries for data associated with groups to be aggregated in that processor of said T aggregate queries;

(k) iterating said step (j) until each said processor completes the execution of said T aggregate queries for all data associated with groups to be aggregated in that processor of said T aggregate queries; and (l) iterating said steps (h) to (k) until the execution of said N aggregate queries is completed; and executing said N aggregate queries by the determined method.

* * * * *